United States Patent
Iezawa et al.

[11] Patent Number: 6,008,461
[45] Date of Patent: Dec. 28, 1999

[54] WIRE ELECTRODE DISCHARGE MACHINING APPARATUS

[75] Inventors: Masahiro Iezawa; Akihiko Imagi; Tsutomu Sasaki; Makoto Tanaka; Toshio Moro, all of Tokyo, Japan

[73] Assignee: Mitsubishi Denki Kabushiki Kaisha, Tokyo, Japan

[21] Appl. No.: 08/978,583

[22] Filed: Nov. 26, 1997

[30] Foreign Application Priority Data

May 21, 1997 [JP] Japan .................................... 9-131263

[51] Int. Cl.$^6$ .............................. B23H 1/00; B23H 7/02
[52] U.S. Cl. ...................................... 219/69.12; 219/69.14
[58] Field of Search ........................... 219/69.11, 69.14, 219/69.12

[56] References Cited

U.S. PATENT DOCUMENTS

| | | | |
|---|---|---|---|
| 4,521,661 | 6/1985 | Inoue | 219/69.12 |
| 4,792,653 | 12/1988 | Futamura | 219/69.12 |
| 5,410,119 | 4/1995 | Lehmann | 219/69.12 |

FOREIGN PATENT DOCUMENTS

| | | | |
|---|---|---|---|
| 60-177825 | 9/1985 | Japan | 219/69.11 |
| 62-264830 | 11/1987 | Japan . | |
| 61-86130 | 4/1988 | Japan . | |
| 63-99128 | 4/1988 | Japan . | |
| 63-179024 | 7/1988 | Japan . | |
| 2555331 | 9/1996 | Japan . | |

*Primary Examiner*—Geoffrey S. Evans
*Attorney, Agent, or Firm*—Sughrue, Mion, Zinn, Macpeak & Seas, PLLC

[57] ABSTRACT

A wire electrode discharge machining apparatus includes a hollowed beam member 16 coupled with the front side of a column 4 by a guide vertically movable with respect to a table 2, a pipe 17 for supplying to the beam member 16 a machining liquid 15 whose temperature has been controlled by a machining liquid cooling means 13, a pipe 18 for supplying to a machining bath 10 the machining liquid 15 that is supplied from the pipe 17 to the beam member 16, a covering member 19, made of adiabatic material, for covering the outer surface of a temperature sensor 14, which is attached to the body proper of the wire electrode discharge machining apparatus, a cover 20 for covering the apparatus body, an adiabatic member 21 attached to the cover 20; and a fan 22 provided inside a covering structure including the members 20 and 21.

16 Claims, 20 Drawing Sheets

FIG.4A
FIG.4B
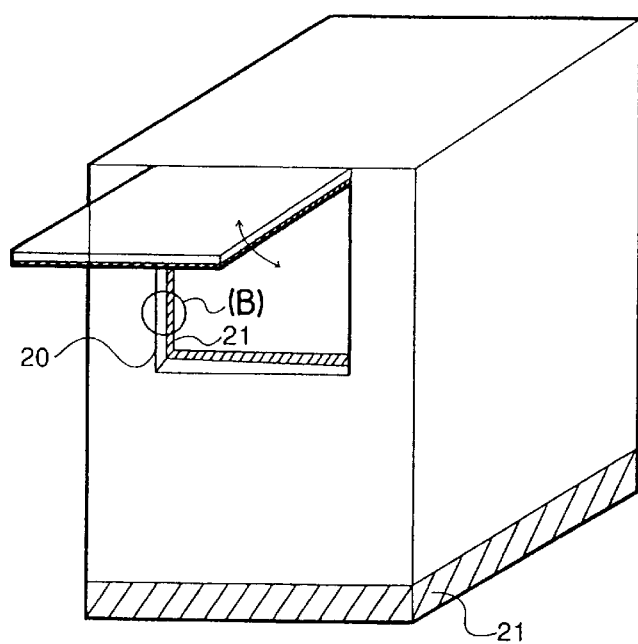
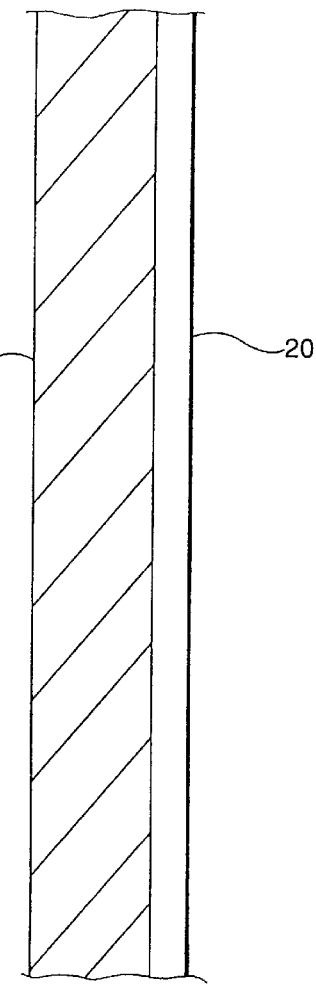

WIRE ELECTRODE DISCHARGE MACHINING APPARATUS

BACKGROUND OF THE INVENTION

1. Field of the Invention

The present invention relates to an electrode discharge machining apparatus in which a minute gap between a wire electrode and a workpiece is filled with machining liquid, a discharge is caused in the gap, whereby the workpiece is machined.

2. Description of the Related Art

FIG. 18 is a diagram showing a first conventional wire electrode discharge machining (EDM) apparatus (referred to as a prior art 1). In FIG. 18, reference numeral 1 is a bed as a base of the wire EDM apparatus; 2 is a table put on the bed 1; 3 is a saddle mounted on the bed 1 mounted on the table 2 by a guide such that it is horizontally movable with respect to the table 2; 4 is a column mounted on the saddle 3 by a guide such that it is movable to the front and back directions with respect to the table 2; 5 is a beam member coupled with the front side of the column 4 by a guide vertically movable with respect to the table 2; 6 is an upper wire guide fixed to the beam member 5; 7 is a lower arm fixed to the column 4; 8 is a lower wire guide fixed to the tip of the lower arm 7; 9 is a workpiece 9 fixedly mounted on the table 2; 10 is a machining bath put on the bed 1; 11 is a wire electrode supported by the upper and lower wire guides 6 and 7; 12 is a machining liquid supplying means; 13 is a machining liquid cooling means; 14 is a temperature sensor for the machining liquid cooling means 13; and 15 is insulating, machining liquid, which is supplied from the machining liquid supplying means 12 to the machining bath 10 by way of the machining liquid cooling means 13. The machining liquid 15, soiled through a machining process, is gathered by the machining liquid supplying means 12 and filtered, and supplied again to the machining bath 10. The machining liquid cooling means 13 controls a temperature value of the machining liquid 15 so that it is equal to the sum of a temperature value detected by the temperature sensor 14 and an offset value. To machine the workpiece, a pulse voltage is applied between the wire electrode 11 and the workpiece 9, from a power source, not shown. Discharge takes place in the fine gap between the wire electrode 11 and the workpiece 9, to thereby effect the machining of the workpiece.

FIG. 19 is a diagram showing a second conventional wire electrode discharge machining apparatus (prior art 2), disclosed in Japanese Patent Laid-Open Publication No. Sho. 62-264830.

The construction of the wire EDM apparatus shown in FIG. 19 will be described hereunder. In the figure, reference numeral 46 is a bed; 47 is a column; 48 is an upper arm; 49 is a lower arm; 50 is a wire electrode; 51 is an electrode reel; 52 is a take-up roll; 53 is an upper guide; 54 is a lower guide; and 55 is a UV table for positioning the upper guide 53 when it is driven by a control unit, not shown. 56 is an XY table driven to move in two directions, orthogonal to each other, when it is driven by the control unit, not shown. 57 is a workpiece; 58 is workpiece supporting means; 59 is a shielding member; 60 is a bellow means; and 61 is an air inlet.

In FIG. 19, the shielding member 59 forms a space, substantially closed, in at least a major structure. For the UV table 55 and the XY table 56, the bellow means 60 is provided in a part of the shielding member 59 and a plural number of air inlets 61 and an air outlet, not shown, are provided therein. Gas is introduced into the space formed by the shielding member 59, through the air inlets 61, whereby the space is kept at fixed temperature and humidity values. The temperature and humidity values of the gas introduced through the air inlets 61 are adjusted corresponding to the temperature and humidity values in the space.

FIG. 20 is a diagram showing a third conventional wire electrode discharge machining apparatus (prior art 3), disclosed in Japanese Patent Laid-Open Publication No. Sho. 63-99128.

The construction of the wire EDM apparatus shown in FIG. 20 will be described hereunder. In the figure, reference numeral 62 is a tank for storing machining liquid; and 64 is a cooler for cooling machining liquid 63. The machining liquid 63, after cooled by the cooler, is led through a pulse power source unit 66 to a first passage A by a pump 65. The first passage A leads the machining liquid to between the electrodes, through an upper machining liquid ejecting nozzle 67 and a lower machining liquid ejecting nozzle 68. The machining liquid 63 is supplied, by the pump 65, to a second passage B, through upper and lower arms 69 and 70, and a machining bed 72 on which a workpiece 71 is located. Two passages, the first and second passages A and B, are provided for the cooled machining liquid 63 in order to improve a cooling efficiency. In the first passage A, the machining liquid is first used to cool the pulse power source unit 66, and the heated liquid is fed to between the electrodes. The second passage B is used for cooling the mechanism.

FIG. 21 is a diagram showing a fourth conventional wire electrode discharge machining apparatus (prior art 4), disclosed in Japanese Patent Laid-Open Publication No. Sho. 63-179024.

The construction of the wire EDM apparatus shown in FIG. 21 will be described hereunder. In the figure, reference numeral 73 is a workpiece; 74 is a surface plate; 75 is an upper wire guide; 76 is a lower wire guide; 77 is a wire electrode; 78 is a lower arm; 79 is a column; 80 is a pipe; 81 is a motor driven fan; and 82 is air.

The wire electrode discharge machining apparatus machines the workpiece 73 in a desired shape by the wire electrode 77, while blowing machining liquid against a machining part of the workpiece 73. In this EDM apparatus, a holding means of the lower wire guide 76 for holding the wire electrode 77 is hollowed. The EDM apparatus is provided with means for feeding cooled fluid into the hollow of the holding means.

FIG. 22 is a diagram showing a fifth conventional wire electrode discharge machining apparatus (prior art 5), disclosed in Japanese Patent Laid-Open Publication No. Sho. 61-86130.

The construction of the wire EDM apparatus shown in FIG. 22 will be described hereunder. In the figure, reference numeral 83 is a main body of the wire electrode discharge machining apparatus; 84 is a control unit including an NC device and a machining power source; 85 is a machining liquid supplying device; 86 is a cable for connecting the control unit 84 to the machining apparatus body 83; and 87 is a cable for connecting the machining apparatus body 83 to the machining liquid supplying device 85. Numeral 88 is a machining liquid exhausting pipe for discharging machining liquid from the machining apparatus body 83 to the machining liquid supplying device 85. Numeral 89 is a filter for filtering the machining liquid in the bath. 90 is an outside temperature sensing device for measuring temperature outside the machining apparatus body 83. 91 is a machining liquid temperature sensing device for measuring temperature of the machining liquid within the bath. 92 is a preheater for preheating the machining liquid of the bath up to a temperature set in advance by the control unit 84. 93, 94 and 95 are cables for connecting the control unit 84 to the outside temperature sensing device 90, machining liquid temperature sensing device 91, and preheater 92.

Problems of the wire electrode discharge machining apparatus of the prior art 1 follows. In the EDM apparatus, the lower arm extended from the column is put in the machining liquid and the beam member also extended from the column is put in the air. A temperature difference appears between the beam member and the lower arm because there is a temperature difference between the machining liquid and the discharge machining apparatus, a difference between the time constants of their temperature variations of them and outside air. The thermal expansions of the lower arm and the beam member displace those members from their correct positions. As a result, the upper wire guide is positionally shifted relative to the lower wire guide, which are held at the tips of the upper and lower arms. This leads to the deterioration of the straightness of the wire electrode and the machining accuracy of the discharge machining apparatus.

To secure a highly accurate machining, the wire EDM apparatus may be installed in a thermostatic room whose temperature is controllable. It is inevitable, however, that a person comes in and goes out of the thermostatic room. In other words, thermal disturbances are inevitably generated. FIG. 23 is a graph showing a variation of room temperature around the wire EDM apparatus which is placed in a thermostatic room. As seen from the graph, room temperature is varied approximately 1.5° C. for a day. The temperature increase corresponds to 20 μm per 1 m of the thermal expansion of the member whose thermal expansion coefficient is $11.8 \times 10{-61}/°$ C. Since a temperature sensor put on the cast structure directly contacts with the gas in the constant temperature room, the room temperature variation affects the temperature values sensed by the sensor. Therefore, the machining liquid temperature varies with a variation of the room temperature. The temperature variation of the cast structure does not instantaneously respond to the room temperature variation. Therefore, temperature of a portion of the cast structure directly contacting with the machining liquid is different from temperature of the remaining portion not contacting with the machining liquid. The result is that a thermal expansion difference is created between the upper and lower wire guides, and the machining accuracy of the wire EDM apparatus is degraded.

The problems of the conventional wire EDM apparatus of the prior art 2 follows. In the EDM apparatus, gas is introduced into the space encompassed by the shielding member that surrounds a major structure of the wire EDM apparatus, to thereby control temperature of the gas around the wire EDM apparatus located in the space enclosed by the shielding member. In order that temperature of the major structure of the EDM apparatus of large heat capacity and temperature of the gas within the shielding member are kept constant, the air conditioner of large capacity and high performance is required. It is difficult to manufacture the products or the EDM apparatuses at practically acceptable prices, however.

A large room is required for installing the EDM apparatus. Therefore, when the wire EDM apparatus of the prior art 2 occupies a large volume of space in the limited space within the constant temperature room. In an extreme case, the installing of the EDM apparatus in the room is impossible or the expansion of the constant temperature room is required.

Further, a large amount of heat is generated by the heat exchanger of the air conditioner of the EDM apparatus. Under this condition, if the wire EDM apparatuses of the prior art 1 and 2 are installed close to each other, a thermal deformation of the prior art 1 is increased, so that the machining accuracy of the prior art 2 is deteriorated.

Where temperature inside the shielding member is directly controlled by introducing gas into the inside of the shielding member, a temperature difference is created between a portion of the major structure of the EDM apparatus where it directly comes in contact with the temperature controlled gas and the remaining portion not directly contacting with the same, and between the portions of the major structure close to and far from the gas inlets. The temperature difference leads to thermal expansion differences of those portions, and degradation of the machining accuracy of the wire EDM apparatus.

The conventional EDM apparatus of the prior art 3 is a wire cut electrode discharge machining apparatus. This type of the apparatus carries out the discharge machining while applying voltage between the wire electrode and the workpiece. The EDM apparatus includes two machining liquid passages, first and second passages. In the first passage, cooled machining liquid is fed from the tank to between the wire electrode and the workpiece, through the power source unit and the upper and lower nozzles. In the second passage, the machining liquid is fed to a region at and near the workpiece, through the upper and lower arms and the machining bed on which the workpiece is located. Therefore, a temperature difference is created between the machining liquid flowing through the upper and lower arms and the machining liquid that is fed from the tank to between the wire electrode and the workpiece, through the power source unit and the upper and lower nozzles. The temperature difference brings about the thermal expansion difference of the mechanical parts and components in the apparatus, and machining accuracy degradation.

Where the machine body is cooled by the cooled machining liquid, some portions of the machine body are cooled and some portions are not cooled. Therefore, a temperature distribution is not uniform in the wire electrode discharge machining apparatus. The result is that local deformations appear in the wire electrode discharge machining apparatus, and thermal expansions of the upper and lower arms, and the machining bed are different from one another. To make uniform the temperature distribution of the machine body, it is necessary to cool the upper and lower arms, and further whole machine structure including the machining bed. The result is an increase of the cooling capacity of the cooler and an increase of the complexity of the cooler structure, and therefore makes it difficult to manufacture the products of practically acceptable costs.

The wire electrode discharge machining apparatus of the prior art 4 machines the workpiece in a desired shape by the wire electrode, while blowing machining liquid against a machining part of the workpiece. In this EDM apparatus, a holding means of the lower wire guide 76 for holding the wire electrode 77 is hollowed. Cooled fluid is fed into the hollow of the holding means. If the machining liquid whose temperature is controlled in accordance with outside temperature, variations of temperature of the main body of the discharge machining apparatus and outside temperature will have different time constants. As a result, a thermal expansion difference will be created between the wire guide and the mechanical structure for holding the work, and the machining accuracy of the discharge machining apparatus will be deteriorated.

In the wire electrode discharge machining apparatus of the prior art 5, the machining liquid is preheated in accordance with an increased temperature value of the machining liquid currently used for machining, which is measured or calculated, and an outside temperature value measured by a thermal sensor device. The preheated machining liquid is circulated through the main body of the discharge machining apparatus. To set the respective points of the whole apparatus at the temperature value of the preheated machining liquid, it is necessary to arrange the passage for circulating the machining liquid throughout the apparatus. In the discharge machining apparatus, the liquid circulating passage is, of necessity, long. The long passage results in a complex structure of the discharge machining apparatus, and an increase of cost to manufacture. The discharge machining apparatus where temperature of the machining liquid follows a variation of outside temperature is disadvantageous in that if the machining liquid is circulated through a part of the discharge machining apparatus, a time constant of a temperature variation at a portion of the apparatus where it comes in contact with the machining liquid becomes different from temperature variation time constants at the remaining portions thereof where those are not in contact with the machining liquid. The result is to increase a deviation in a temperature distribution of the apparatus. To avoid such a thermal deviation, it is necessary to arrange the machining liquid passage throughout the apparatus. This necessitates a long machining liquid passage and high cost to manufacture.

SUMMARY OF THE INVENTION

The present invention is made to solve the problems of the prior apparatuses and has an object to provide a wire electrode discharge machining apparatus which can work an object at high working precision, with its advantageous function to minimize a positional shift of the upper wire guide relative to the lower wire guide, which is due to a thermal deviation in the discharge machining apparatus.

A first aspect of the invention defines a wire electrode discharge machining apparatus having upper and lower wire guides for slidably supporting a wire electrode above a workpiece, nozzles of the upper and lower wire guides, a beam member being horizontally extended, one end of the beam member being integral with a column or vertically movable, and the other end thereof being provided with the upper wire guide, a lower arm of which one end is fixed to the column and other end is provided with the lower wire guide, whereby a workpiece is machined in a discharging manner while machining liquid is supplied from the nozzles to a working portion, the improvement being characterized in that a machine temperature detecting means for detecting temperature of a main body of the wire electrode discharge machining apparatus is provided, the beam member and the lower arm are hollowed, and a fluid whose temperature is adjusted to machine temperature derived from the machine temperature detecting means is circulated through the beam member and the lower arm.

A second aspect of the invention defines a wire electrode discharge machining apparatus having upper and lower wire guides for slidably supporting a wire electrode above a workpiece, nozzles of the upper and lower wire guides, a beam member being horizontally extended, one end of the beam member being integral with a column or vertically movable, and the other end thereof being provided with the upper wire guide, a lower arm of which one end is fixed to the column and other end is provided with the lower wire guide, whereby a workpiece is machined in a discharging manner while machining liquid is supplied from the nozzles to a working portion, the improvement being characterized in that a machine temperature detecting means for detecting temperature of a main body of the wire electrode discharge machining apparatus is provided, the lower arm is hollowed, a housing member is provided in contact with the outer surface of the beam member, and a fluid whose temperature is adjusted to machine temperature derived from the machine temperature detecting means is circulated through the housing and the beam member.

A third aspect of the invention specifically defines the wire electrode discharge machining apparatus according to the first and second aspect of the invention such that a fluid circulating through the beam member and the lower arm or the housing member provided in contact with the outer surface of the beam member and the lower arm is a machining liquid whose temperature is adjusted to machine temperature derived from the machine temperature detecting means.

A fourth aspect of the invention defines a wire electrode discharge machining apparatus having upper and lower wire guides for slidably supporting a wire electrode above a workpiece, nozzles of the upper and lower wire guides, a beam member being horizontally extended, one end of the beam member being integral with a column or vertically movable, and the other end thereof being provided with the upper wire guide, a lower arm of which one end is fixed to the column and other end is provided with the lower wire guide, whereby a workpiece is machined in a discharging manner while machining liquid is supplied from the nozzles to a working portion, the improvement characterized in that a machine temperature detecting means for measuring temperature of a main body of the wire electrode discharge machining apparatus is provided, and a fluid whose temperature is adjusted to machine temperature derived from the machine temperature detecting means is a machining liquid supplied from the nozzles.

A fifth aspect of the invention defines a wire electrode discharge machining apparatus having upper and lower wire guides for slidably supporting a wire electrode above a workpiece, nozzles of the upper and lower wire guides, a beam member being horizontally extended, one end of the beam member being integral with a column or separated from the column, and the other end thereof being provided with the upper wire guide, a lower arm of which one end is fixed to the column and other end is provided with the lower wire guide, whereby a workpiece is machined in a discharging manner while machining liquid is supplied from the nozzles to a working portion, the improvement characterized in that a part or the whole of the wire electrode discharge machining apparatus is covered with covering means made of an adiabatic material.

The wire electrode discharge machining apparatus of a sixth aspect of the invention is characterized in that a temperature controlled fluid is circulated through the covering means.

The wire electrode discharge machining apparatus of a seventh aspect of the invention is characterized in that the fluid is agitated in the covering means.

The wire electrode discharge machining apparatus of an eighth aspect of the invention is characterized in that the fluid inside the covering means is circulated so as to close an opening defined by a door of the covering means.

The wire electrode discharge machining apparatus of a ninth aspect of the invention is characterized in that a partitioning means for partitioning a space in which a machining bath and the cover of the covering means from the remaining space is provided inside the covering means.

The wire electrode discharge machining apparatus of a tenth aspect of the invention is characterized in that covering means made of adiabatic material is disposed surrounding a temperature sensor for controlling the machining liquid.

The wire electrode discharge machining apparatus of an eleventh aspect of the invention is characterized in that covering means made of adiabatic material is disposed surrounding a temperature sensor for controlling the machining liquid.

The wire electrode discharge machining apparatus of twelfth aspect of the invention is characterized in that a gap between the covering means and a floor on which the covering means is put is closed with a flexible member.

The above and other objects and features of the present invention will be more apparent from the following description taken in conjunction with the accompanying drawings.

BRIEF DESCRIPTION OF THE DRAWINGS

FIGS. 4A and 4B are diagrams showing a cover structure including a cover and an adiabatic member in the wire electrode discharge machining apparatus of the first embodiment;

DETAILED DESCRIPTION OF THE PREFERRED EMBODIMENTS

Now, a description will be given in more detail of preferred embodiments of the present invention with reference to the accompanying drawings.

(Embodiment 1)

Figure 1:
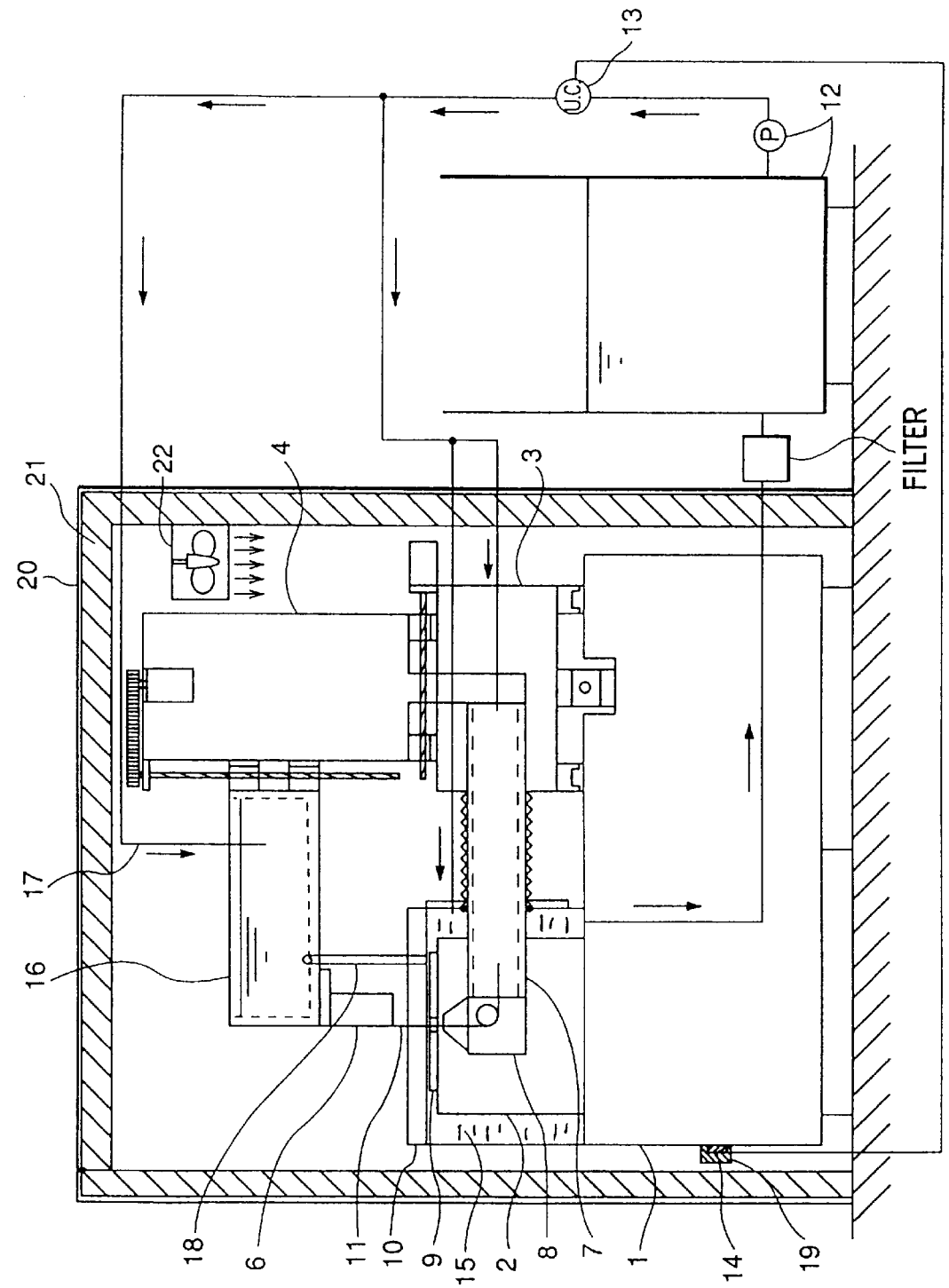
FIG. 1 is a diagram schematically showing a wire electrode discharge machining apparatus according to a first embodiment of the present invention.

FIG. 1 is a diagram schematically showing a wire electrode discharge machining apparatus according to a first embodiment of the present invention. In the figure, reference numerals 1 to 15 designate like portions in the figure referred to in the description of the prior apparatus. Reference numeral 16 designates a beam member coupled with the front side of a column 4 by means of a guide vertically movable with respect to a table 2. 17 is a pipe for supplying a machining liquid 15 to the beam member 16. Temperature of the machining liquid 15 has been controlled by a machining liquid cooling means 13. 18 is a pipe for supplying the machining liquid 15 from the beam member 16 to the machining bath 10. This machining liquid 15 is supplied from the pipe 17 to the beam member 16. 19 is a covering member, made of adiabatic material, which covers the outer surface of a temperature sensor 14, which is attached to the body proper of the wire electrode discharge machining apparatus. 20 is a cover which covers the apparatus body. 21 is an adiabatic member attached to the cover 20. 22 is a fan provided inside a covering structure the members 20 and 21.

Figure 2A:
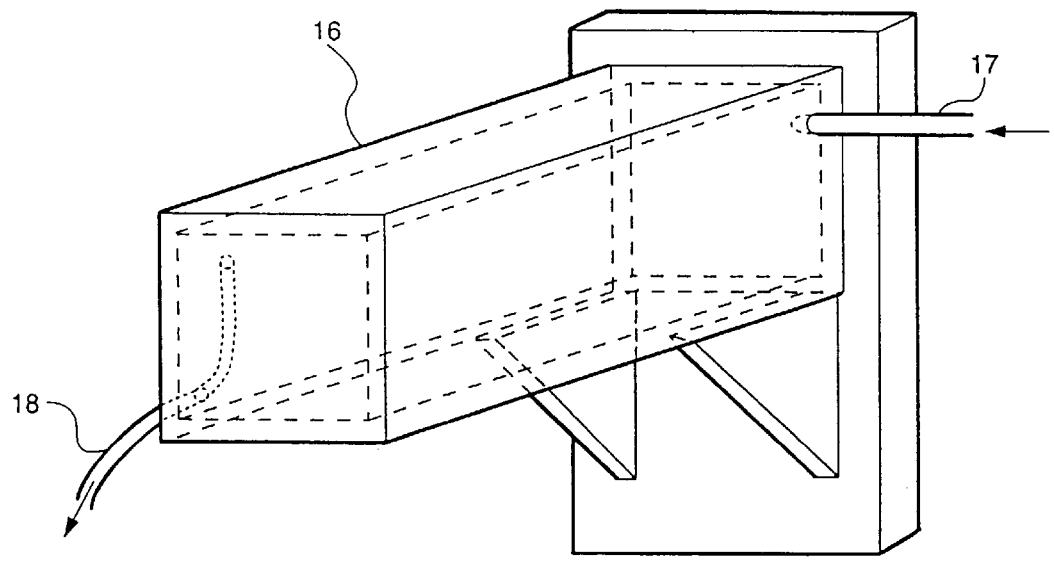
FIG. 2A is a perspective view mainly showing a beam member used in the wire electrode discharge machining apparatus according to a first aspect of the first embodiment.

A construction including the beam member 16 and the pipes 17 and 18 is shown in detail in FIG. 2A. As shown, the beam member 16 is hollowed to have a space therein. The pipes 17 and 18 are communicatively coupled with the inner space of the beam member 16. The pipe 18 is communicatively connected between the beam member 16 and a machining bath 10. The machining liquid 15 is supplied from the beam member 16 to the machining bath 10, and discharged through a scupper of the machining bath 10.

In the wire electrode discharge machining apparatus thus constructed, heat is transferred between the machining liquid 15 supplied to the beam member 16 and the beam member 16. The machining liquid 15 is circulated, within the beam member 16, at such a rate of flow as to be kept at substantially controlled temperature. Therefore, temperature of the beam member 16 is adjusted to be substantially equal to the temperature of the machining liquid 15.

The machining liquid 15, supplied from the machining liquid cooling means 13, is circulated also in a lower arm 7. Therefore, the lower arm 7 and the beam member 16 are placed at nearly equal temperature values. The result is to reduce the thermal expansion difference between the lower arm 7 and the beam member 16, caused by a temperature variation.

It is noted that the machining liquid 15 is supplied from the hollowed beam member 16 to the machining bath 10 via the pipe 18. Therefore, a circulation of the machining liquid 15 to the machining liquid supplying means 12 is realized without additionally forming a scupper to feed the machining liquid 15, which is supplied to and present now in the beam member 16, to a circulating passage of the machining liquid supplying means 12.

Figure 3:
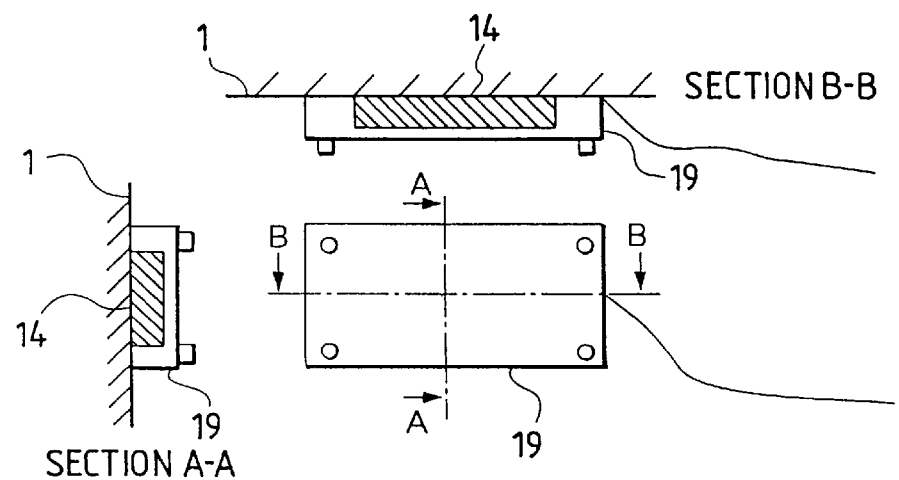
FIG. 3 is a diagram showing a cover structure including a covering member of a temperature sensor in the wire electrode discharge machining apparatus of the first embodiment.

A detailed construction including temperature sensor 14 and the covering member 19 is illustrated in FIG. 3. As shown, the temperature sensor 14 is closely attached to the surface of the bed 1 while being covered with the covering member 19 made of adiabatic material. The covering member 19 prevents the temperature sensor 14 from being in contact with its surrounding air. Therefore, heat generated from the mechanical structure members has a dominant influence on the temperature sensor 14. In other words, the temperature sensor 14 highly accurately senses a temperature variation of the mechanical structure members. In this embodiment, the temperature sensor 14 is attached to the front side of the bed 1, which is located apart from the heat generating sources, such as a drive motor and a power source circuit. Temperature of the structure members of the wire electrode discharge machining apparatus, which are in contact with the machining liquid 15, are adjusted to that of the front side of the bed. The place on which the temperature sensor 14 is mounted is apart from the heat generating sources, such as the drive motor and the power source, and the sensor mounting place is the under side or the internal part of the bed 1, for example. Therefore, a variation of the liquid temperature may be reduced. The result is to reduce a thermal deformation of the table 2 and/or the workpiece 9, both being in contact with the machining liquid. Furthermore, the bed 1, beam member 16 and the lower arm 7 are substantially equal in their temperature values. The result is that the thermal expansions of those members are substantially equal to one another, and that variations of the relative positions of the table 2 and the wire nozzles 6 and 8 are reduced.

Figure 2B:
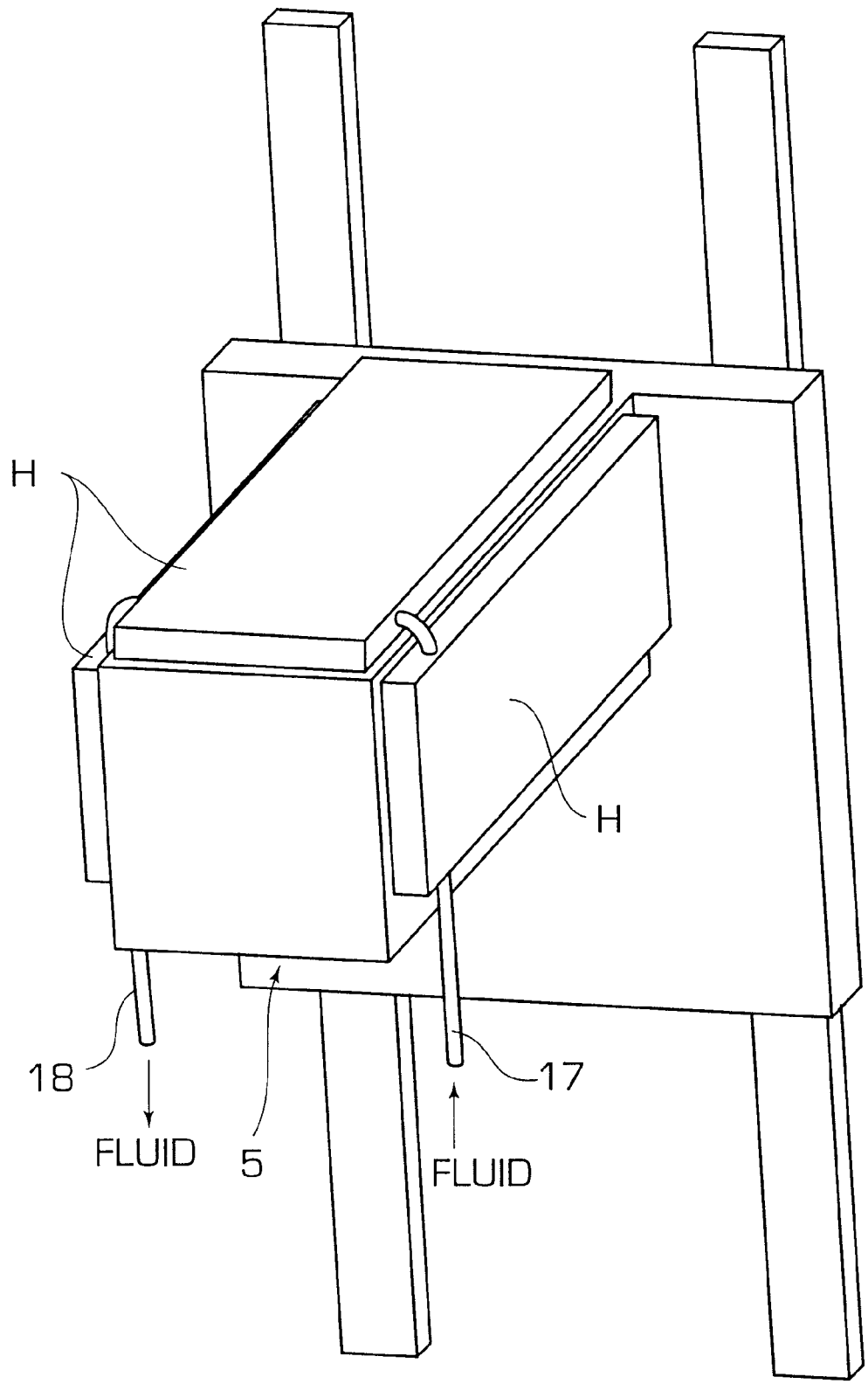
FIG. 2B is a perspective view mainly showing a beam member and a housing member used in the wire electrode discharge machining apparatus according to a second aspect of the first embodiment.
Figure 18:
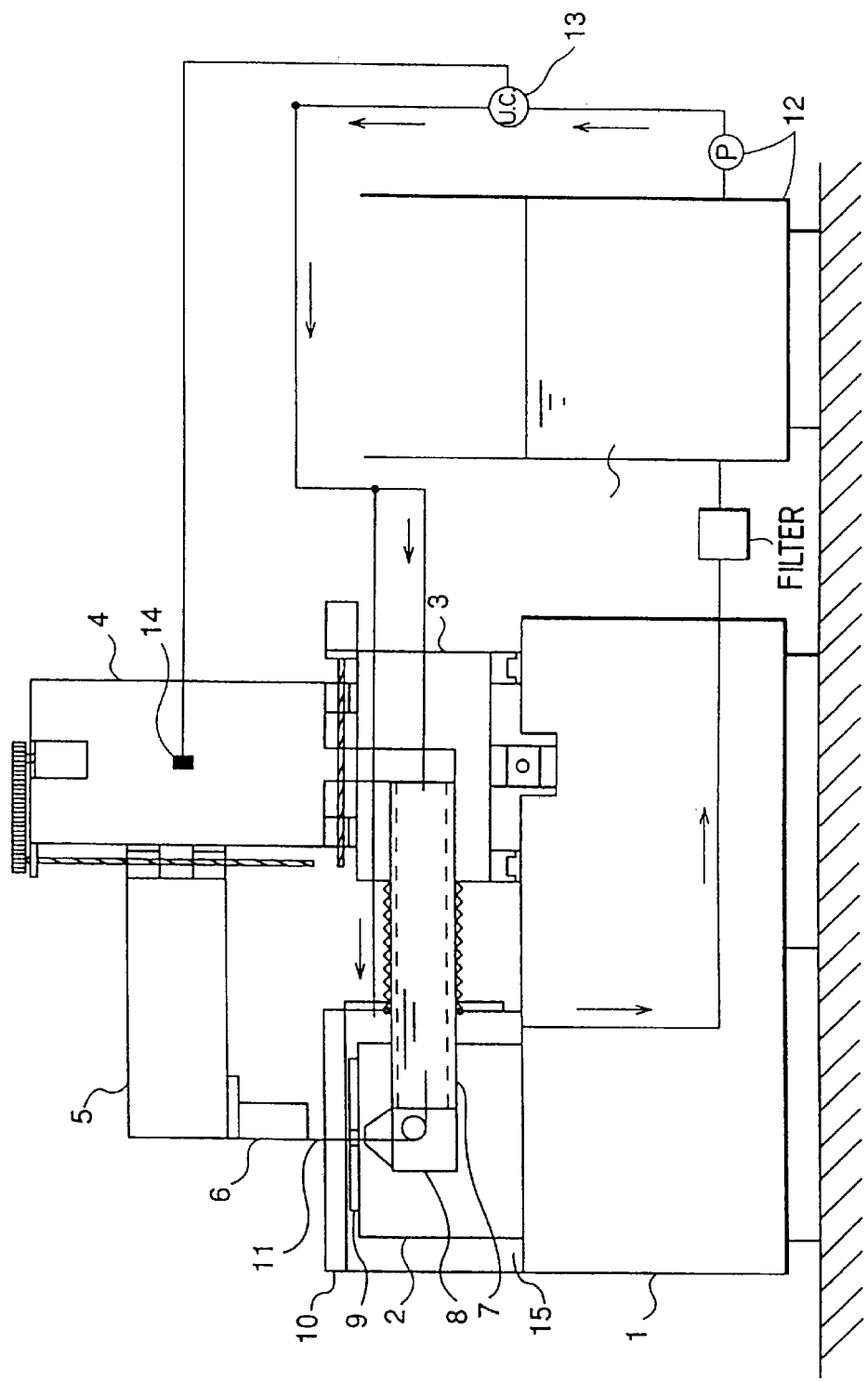
FIG. 18 is a diagram showing a first conventional wire electrode discharge machining apparatus.
Figure 19:
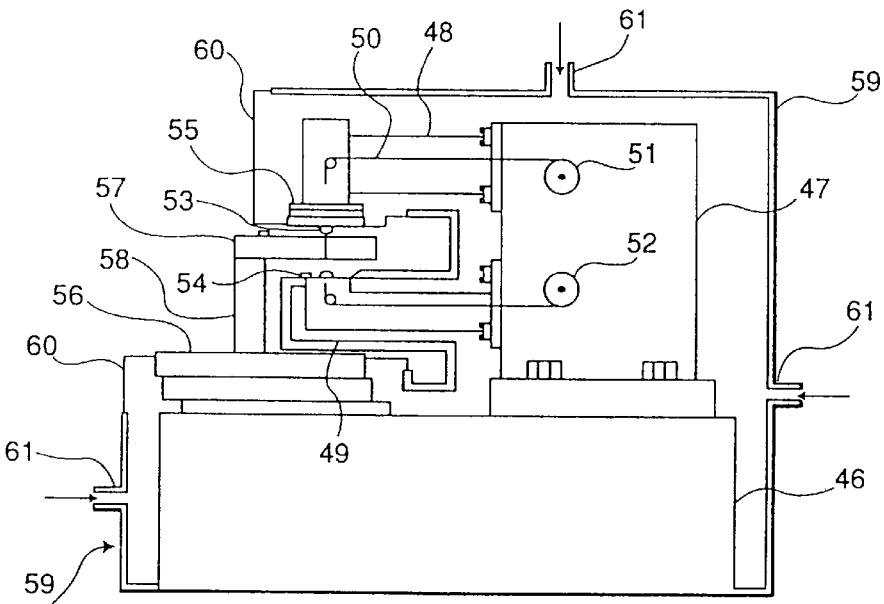
FIG. 19 is a diagram showing a second conventional wire electrode discharge machining apparatus.
Figure 20:
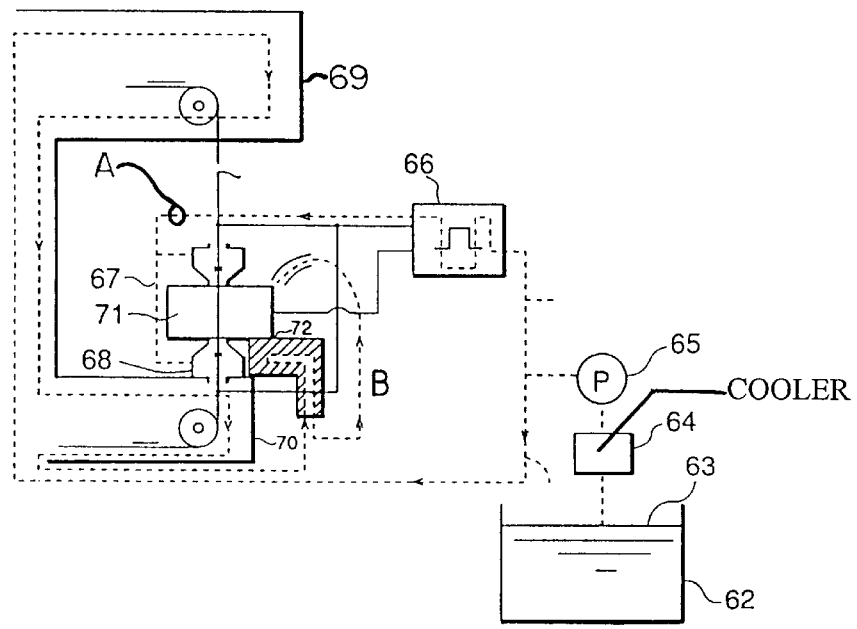
FIG. 20 is a diagram showing a third conventional wire electrode discharge machining apparatus.
Figure 21:
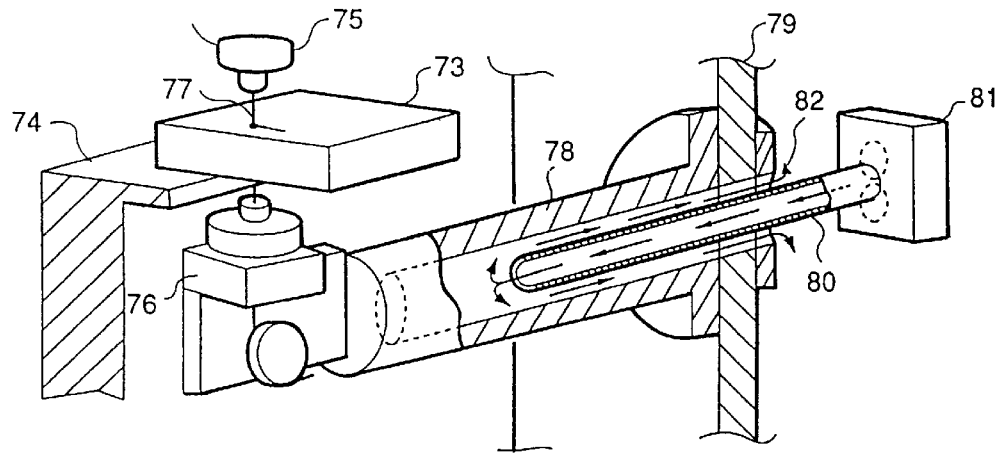
FIG. 21 is a diagram showing a fourth conventional wire electrode discharge machining apparatus.
Figure 22:
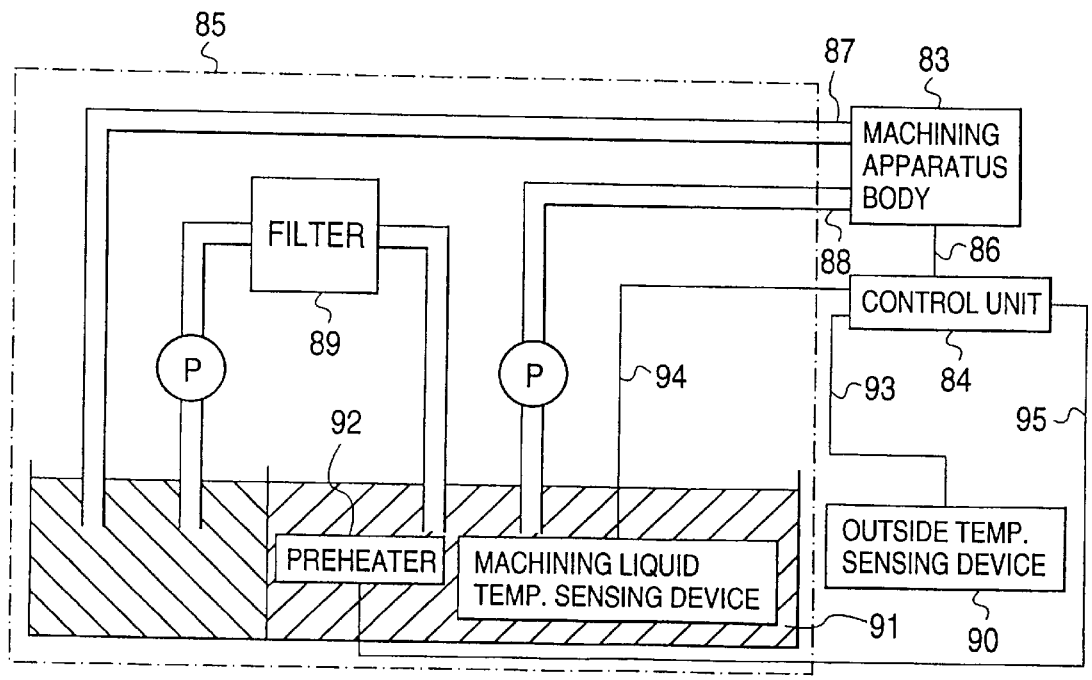
FIG. 22 is a diagram showing a fifth conventional wire electrode discharge machining apparatus.
Figure 23:
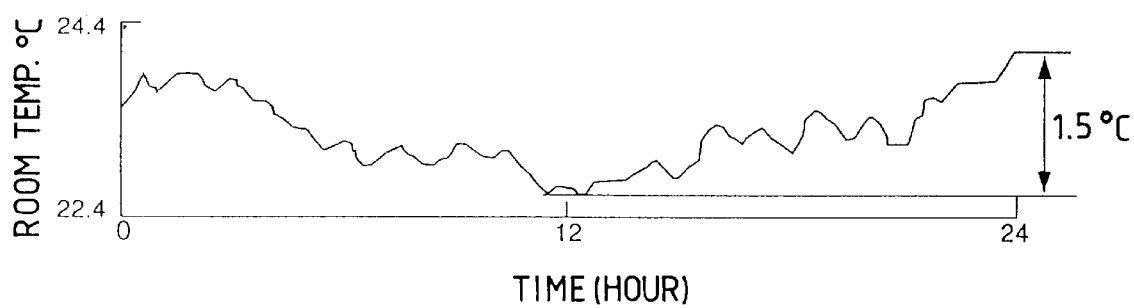
FIG. 23 is a graph showing a variation of room temperature around the wire EDM apparatus which is placed in a thermostatic room.

It will be readily seen in FIG. 2B that the wire electrode discharge machining apparatus, which has the non-cavity type of beam member, such as beam member 5 (illustrated in FIG. 18) coupled with the front side of the column 4 by means of a guide vertically movable with respect to the table 2, and the housing member H in contact with the outer surface of the beam member 5, has also useful effects similar to the above-mentioned ones if the structure members of the machining apparatus are adjusted in temperature to the lower arm 7. The similar useful effects can be obtained by attaching a member of good thermal conduction, which is capable of circulating the machining liquid 15, to the beam member 5 as illustrated in FIG. 2B.

Figure 5:
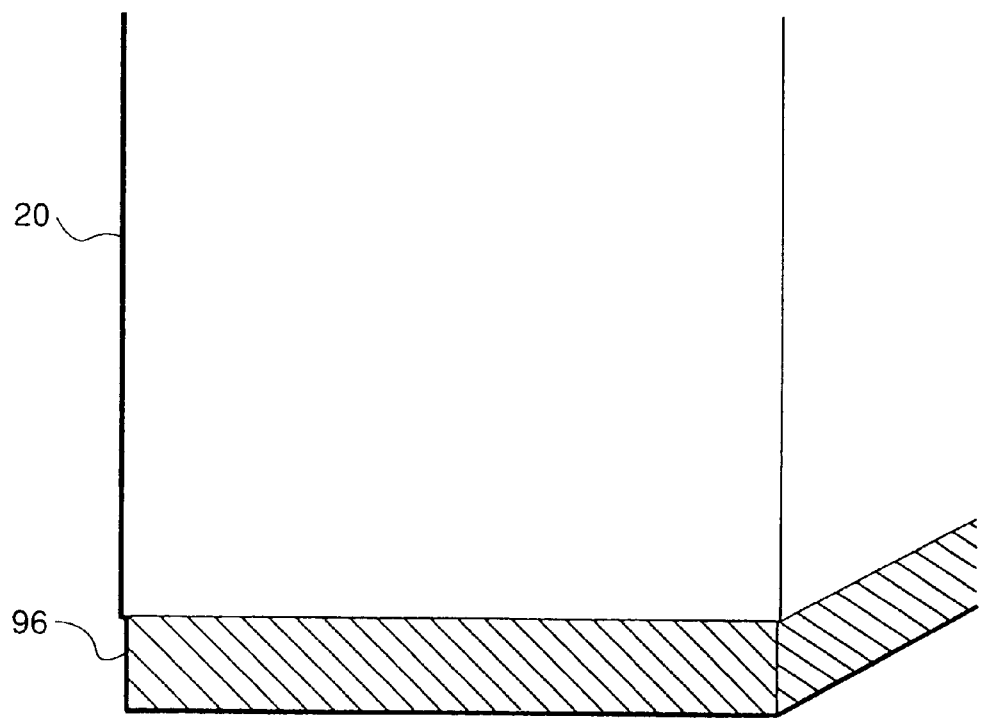
FIG. 5 is a diagram showing another structure of the cover for the floor on which the wire electrode discharge machining apparatus is located.

A cover structure including the cover 20 and the adiabatic member 21 is illustrated in detail in FIGS. 4A and 4B. In this embodiment, the adiabatic member 21 is bonded to the inner surface of the cover 20. If required, it may be bonded to the outer surface of the covering member 20. In the embodiment, the cover 20 and the adiabatic member 21 are provided separately from the body of the wire electrode discharge machining apparatus. If necessary, those members may be incorporated into the main body of the machining apparatus. In the embodiment, a gap between the cover 20 and a floor is closed with the adiabatic member 21. Alternatively, the gap may be closed with a flexible member 96 as shown in FIG. 5.

The combination of the cover 20 and the adiabatic member 21 prevents ambient surrounding air from directly entering the wire electrode discharge machining apparatus. A time constant of the inside of the cover 20 with respect to temperature variation is made slow. This suppresses a temperature variation of the wire electrode discharge machining apparatus, caused by a variation of ambient temperature for a time period of one day. Further, it reduces a thermal deformation of the wire electrode discharge machining apparatus.

Figure 6:
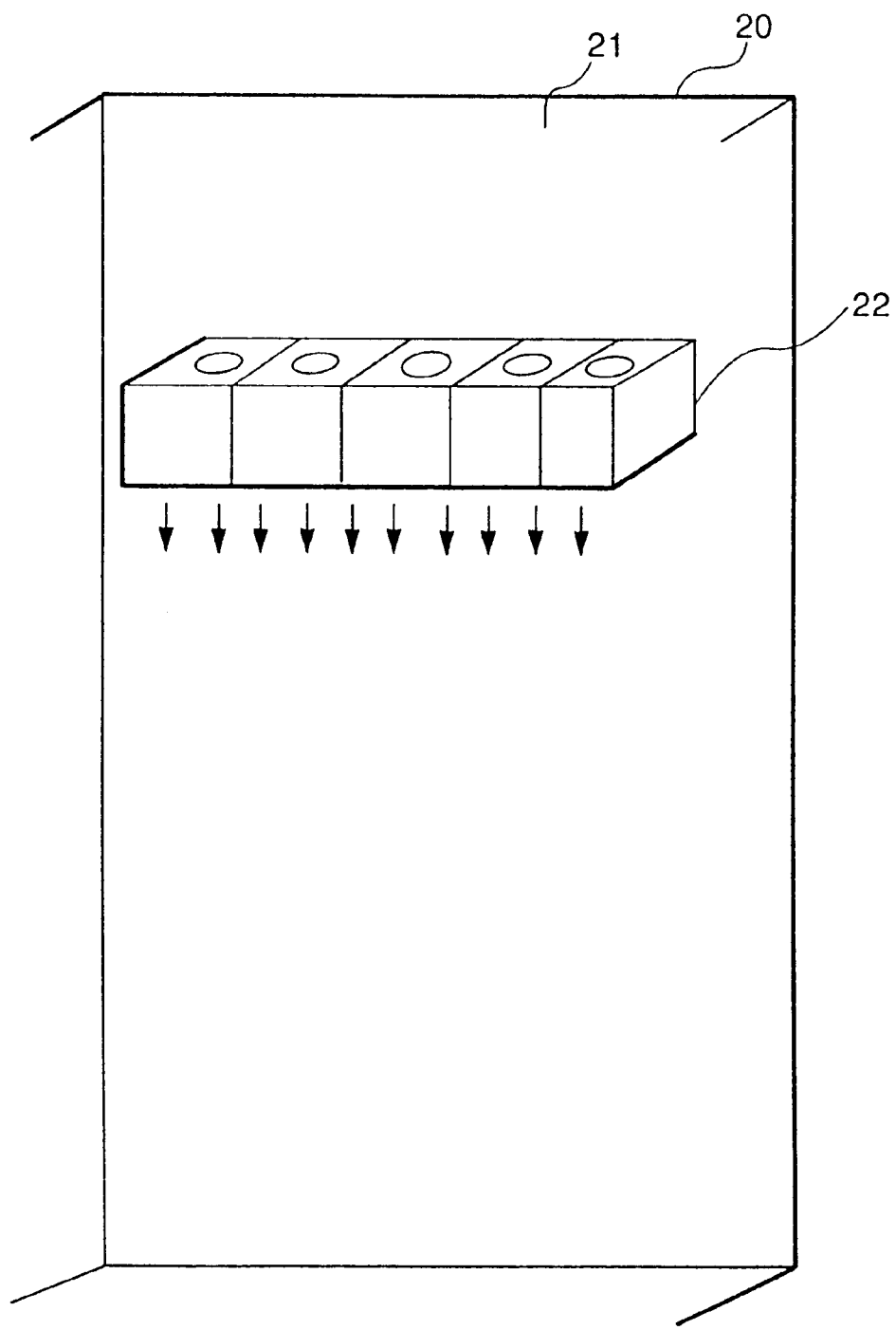
FIG. 6 is a diagram showing a fan used in the wire electrode discharge machining apparatus.

The fan 22 used in the wire electrode discharge machining apparatus is shown in FIG. 6. As shown, in the present embodiment, a plural number of fans 22 are mounted on the surface of the structure of the cover 20 and the adiabatic member 21. The fan 22 is mounted so as to cause a downward flow of air. Necessity is to create a circulation of air flow within the cover 20.

Since the fan 22 agitates air within the structure of the cover 20 and the adiabatic member 21, a temperature distribution is uniform in the main body of the wire electrode discharge machining apparatus. The thermal deformations are also uniform throughout the wire electrode discharge machining apparatus. The uniform thermal deformations entails uniform thermal expansions of the upper and lower wire nozzles. Therefore, an error is reduced which is caused by a positional shift of the wire electrode 11 relative to the workpiece 9, which are located between the upper and lower wire guides 6 and 8. The positional shift is caused by the thermal deformations of those guides. As a result, the working precision of the wire electrode discharge machining apparatus is improved.

Figure 7:
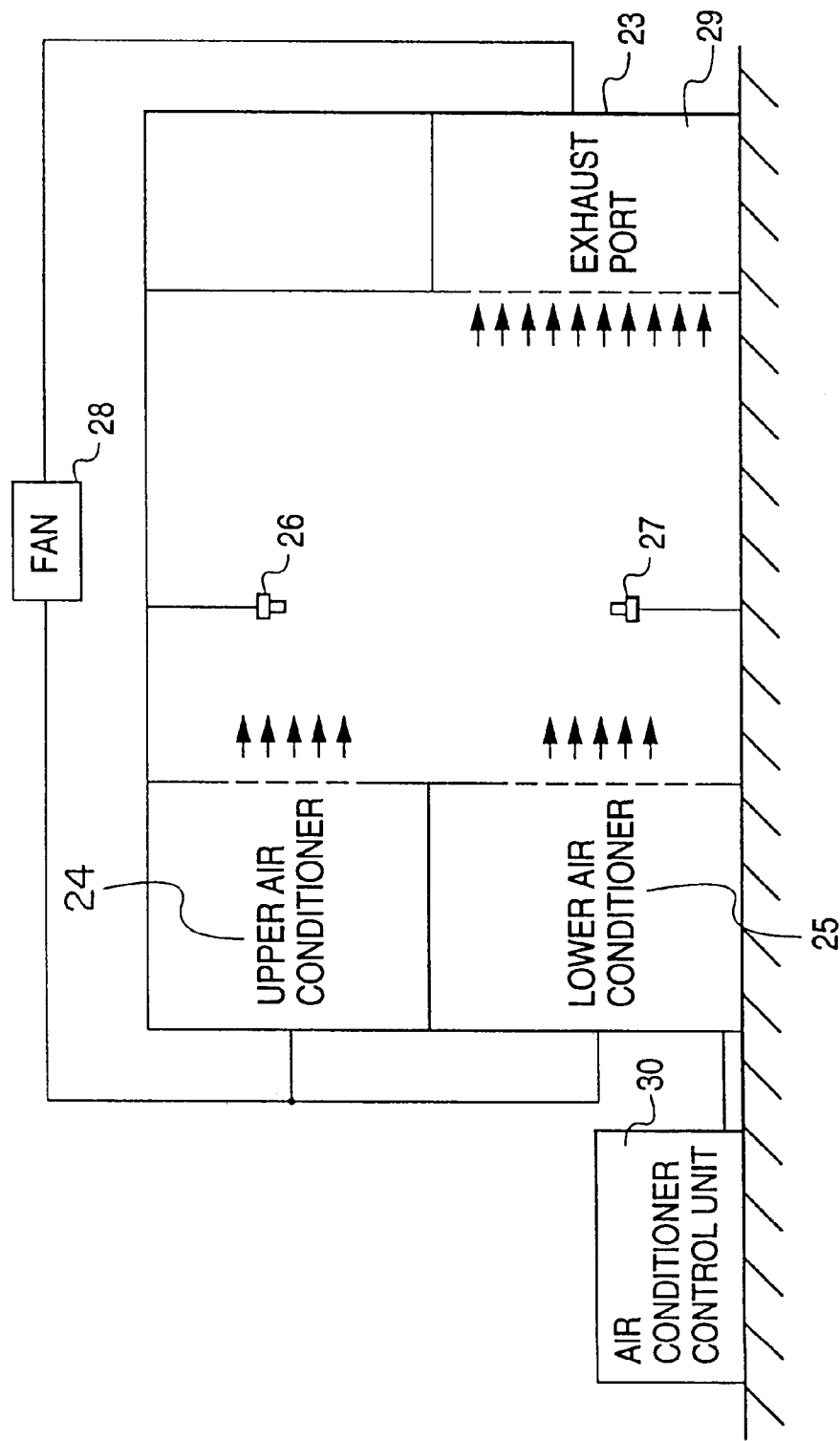
FIG. 7 is a diagram showing a surroundings test room used for confirming the results of the invention.

A surroundings test room, used for confirming the results of the invention will be described. The surroundings test room is constructed as shown in FIG. 7. In the figure, reference numeral 23 is the surroundings test room. 24 is an upper air conditioner mounted on the upper portion of the inner wall of the surroundings test room; 25 is a lower air conditioner mounted on the lower portion of the inner wall of the surroundings test room while being located under the upper air conditioner 24; 26 is a thermal sensor, attached to the ceiling of the test room, for the upper air conditioner; 27 is a thermal sensor, attached to the floor, for the lower air conditioner; 28 is a fan for circulating air within the surroundings test room 23; 29 is an exhaust port of the surroundings test room; and 30 is an air conditioner control unit for controlling the air conditioner. The upper air conditioners 24 and 25 blow air whose temperature is controlled so that temperature in the surroundings test room 23 is varied as indicated by a temperature command value issued from the air conditioner control unit 30. The temperature command value is based on a digital quantity that is converted from physical quantities equivalent to temperature values derived from the thermal sensors 26 and 27. Air is exhausted from the exhaust port 29 so that a constant pressure is set up in the test room. The upper air conditioner 24 and the lower air conditioner 25 are located in the upper and lower portions within the test room 23. Therefore, a temperature distribution is vertically oriented within the test room. A program to set a temperature command at a desired value is installed into the air conditioner control unit 30. The temperature value and a rate of changing of the temperature value with respect to time can be set at desired values.

Figure 8:
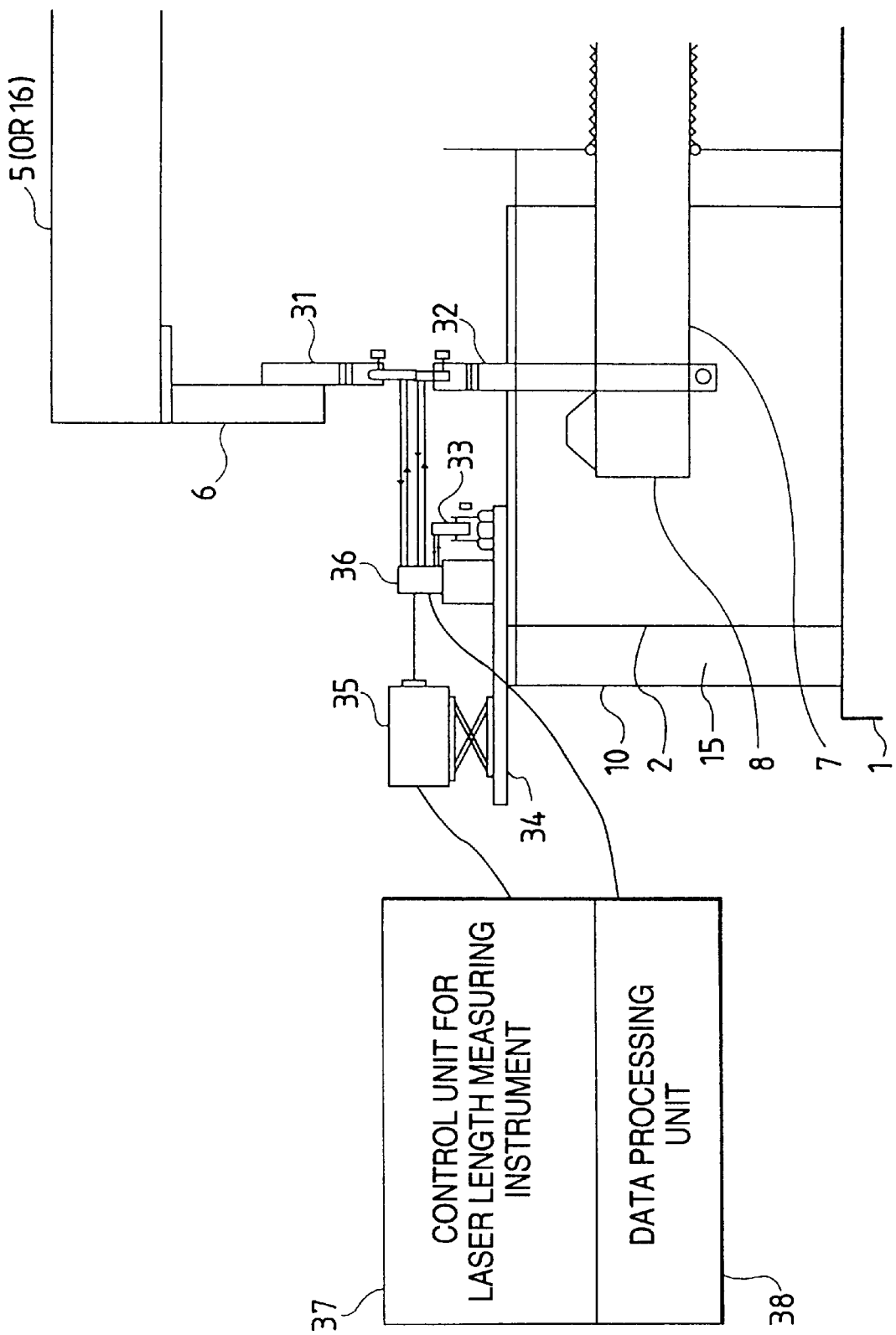
FIG. 8 is a diagram schematically showing a precision position measuring instrument used for confirming the results of the invention.

A precision position measuring instrument used for confirming the results of the invention will be described. A construction of the precision position measuring instrument is as shown in FIG. 8. In the figure, reference numeral 31 is a reflecting mirror fixed to the upper wire guide 6. 32 is a reflecting mirror fixed to the lower wire guide 8. 33 is a reflecting mirror fixed to the table 2. 34 is a metal plate fixed on the table. 35 is a laser light source. 36 is a laser interferometer. 37 is a control unit 37 for a laser length measuring instrument for controlling the laser light source 35. 38 is a data processing unit used for detecting quantities of displacements of the reflecting mirrors 31, 32 and 33 by use of the output signals from the laser interferometer 36. A difference between the displacement quantities of the reflecting mirrors 31 and 32, and the reflecting mirror 33 is calculated by the data processing unit 38. This difference is used for obtaining a difference between the displacement quantities of the wire nozzle 6 and the table 2 and a difference between the tip of the lower arm 7 and the reflecting mirror 33 on the table 2.

Figure 9A:
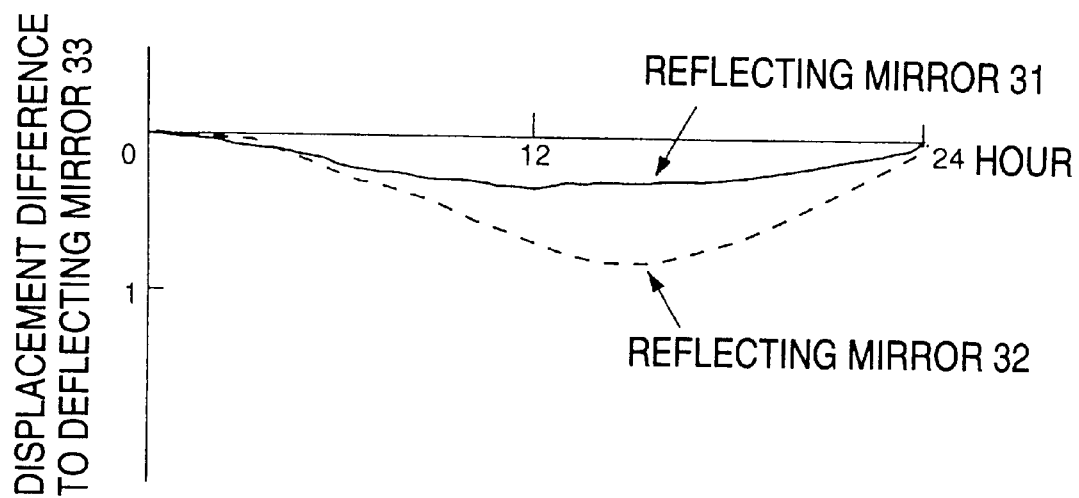
FIGS. 9A and 9B are graphs showing the results of measuring a displacement difference between the upper and lower nozzles in the wire electrode discharge machining apparatus of the first embodiment by use of a precision measuring instrument.
Figure 9B:
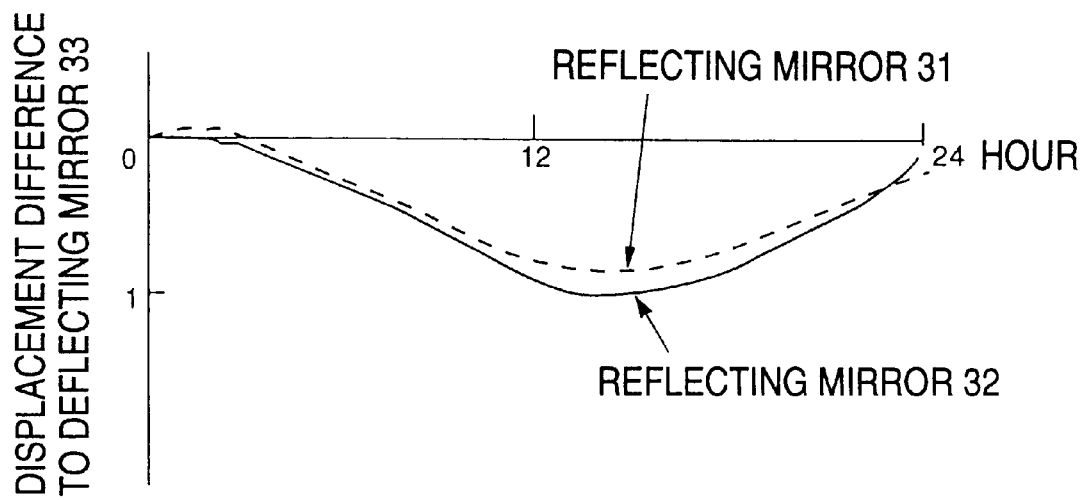

Variations of displacement differences between the reflecting mirrors are graphically represented in FIGS. 9A and 9B. To measure the displacement differences, a conventional wire electrode discharge machining apparatus was placed in the surroundings test room 23. Ambient temperature was increased by 3° at a fixed inclination for 12 hours, and thereafter decreased at a fixed inclination by 3° for 12 hours. A displacement difference between the reflecting mirrors 31 and 33 and a displacement difference between the reflecting mirrors 32 and 33 were detected and calculated by the data processing unit 38. In FIGS. 9A and 9B, the displacement difference values were normalized at the maximum value of the displacement difference between the reflecting mirrors 32 and 33 of the conventional wire electrode discharge machining apparatus. FIG. 9A is a graph showing actually measured displacement difference values of the conventional wire electrode discharge machining apparatus. FIG. 9B is a graph showing actually measured displacement difference values of the apparatus modified and operated such that the beam member 5 is replaced with the beam member 16, and the machining liquid 15 is circulated in a liquid passage including the pipes 17 and 18 and the beam member 16. In the apparatus where the machining liquid 15 is circulated through the beam member 16, the displacement difference between the reflecting mirrors 31 and 33 is substantially coincident, in waveshape, with that between the reflecting mirrors 32 and 33. This makes the deformation quantity of the upper wire guide 6 substantially equal to that of the lower wire guide 8. The inclination of the wire electrode 11 varies depending on a displacement difference between the upper wire guide 6 and the lower wire guide 8. A temperature of the beam member 16 is adjusted to that of the lower arm 7, to thereby minimize a variation of the inclination of the wire electrode 11. The result is a decrease in undulation of the machined surface of the workpiece 9, which is machined through a relative motion of the wire electrode 11 to the workpiece 9, and an improvement of the work surface quality.

Figure 10:
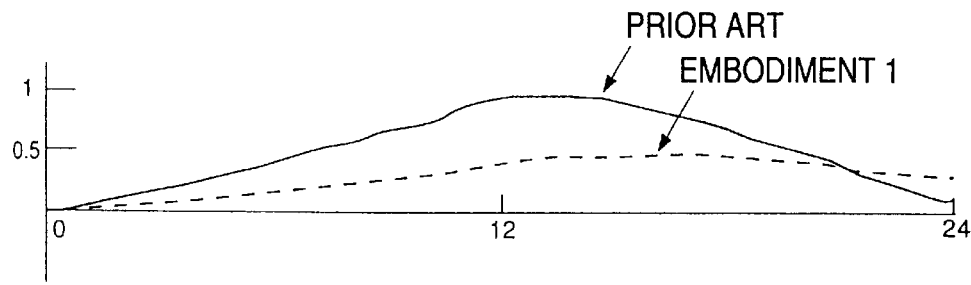
FIG. 10 is a graph showing the results of measuring temperature of the main body of the wire electrode discharge machining apparatus of the first embodiment.

FIG. 10 is a graph showing the results of measuring temperature of the main body of the wire electrode discharge machining apparatus of the first embodiment. To measure the temperature, a conventional wire electrode discharge machining apparatus was placed in the surroundings test room 23. Ambient temperature was increased by 3° at a fixed inclination for 12 hours, and thereafter decreased at a fixed inclination by 3° for 12 hours. The result of the measurement is as indicated by a solid line in FIG. 10. Another measurement was performed in such a manner that the wire electrode discharge machining apparatus of FIG. 1 was placed in the surroundings test room 23. Ambient temperature was increased by 3° at a fixed inclination for 12 hours, and thereafter decreased at a fixed inclination by 3° for 12 hours. The result of the measurement is as indicated by a broken line in FIG. 10. In FIG. 10, the measured temperature values of the conventional wire electrode discharge machining apparatus are normalized at the maximum value of the measure ones.

The air temperature controlled by the upper and lower air conditioners 24 and 25 is blocked from directly flowing into the inside of the apparatus by the structure of the cover 20 and the adiabatic member 21. The blocking of the temperature controlled air and the adiabatic function of the structure cooperatively operate to greatly impede the transfer of heat to the apparatus body. The result is to greatly reduce a temperature variation of the apparatus body.

Figure 11:
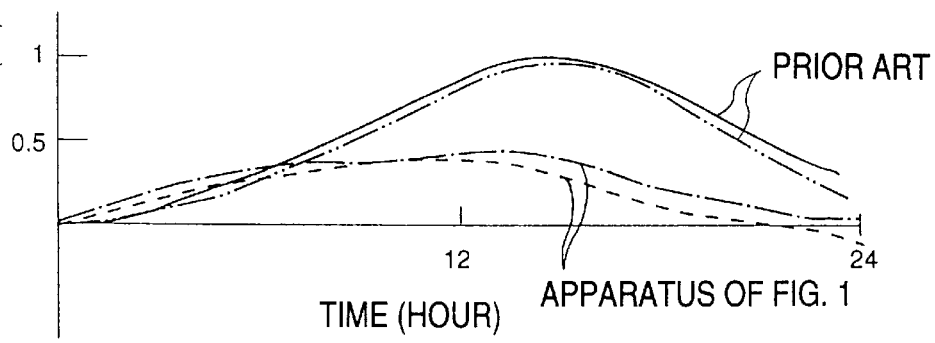
FIG. 11 is a graph showing the results of measuring a displacement difference between the upper and lower nozzles in the wire electrode discharge machining apparatus of the first embodiment by use of a precision measuring instrument.

FIG. 11 is a graph showing the results of measuring a displacement difference between the upper and lower nozzles in the wire electrode discharge machining apparatus of the first embodiment by use of a precision measuring instrument. To measure the temperature, a conventional wire electrode discharge machining apparatus was placed in the surroundings test room 23. Ambient temperature was increased by 3° at a fixed inclination for 12 hours, and thereafter decreased at a fixed inclination by 3° for 12 hours. The displacement quantities of the reflecting mirrors 31 to 33 are detected by the data processing unit 38. Differences between the detected displacement quantities of the reflecting mirrors 31 and 33 were varied as indicated by solid and two-dot chain lines in FIG. 11. Another measurement was performed in such a manner that the FIG. 1 wire electrode discharge machining apparatus was placed in the surroundings test room 23 and the fan was not operated. Ambient temperature was increased by 3° at a fixed inclination for 12 hours, and thereafter decreased at a fixed inclination by 3° for 12 hours. The displacement quantities of the reflecting mirrors 31 to 33 are detected by the data processing unit 38. Differences between the detected displacement quantities of the reflecting mirrors 31 and 33 and between those of the reflecting mirrors 32 and 33 were varied as indicated by broken and one-dot chain lines in FIG. 11.

When comparing the temperature variation profiles shown in FIG. 11, it is seen that the displacement differences between the reflecting mirrors 31 and 33 and between the reflecting mirrors 32 and 33 are reduced. With the structure of the cover 20 and the adiabatic member 21, a temperature variation of the body of the wire electrode discharge machining apparatus is reduced. Therefore, the thermal deformation quantity of the apparatus body is also reduced. This entails the reduction of the displacement quantity difference between the upper wire guide 6 and the table 2, and that between the lower wire guide 8 and the table 2. Therefore, suppression is made of a positional shift of the wire electrode 11 relative to the workpiece 9 placed on the table 2, caused by their thermal deformation resulting from a temperature variation of the apparatus body when ambient temperature varies. The suppressed positional shift leads to the improvement of the machining accuracy.

Figure 12A:
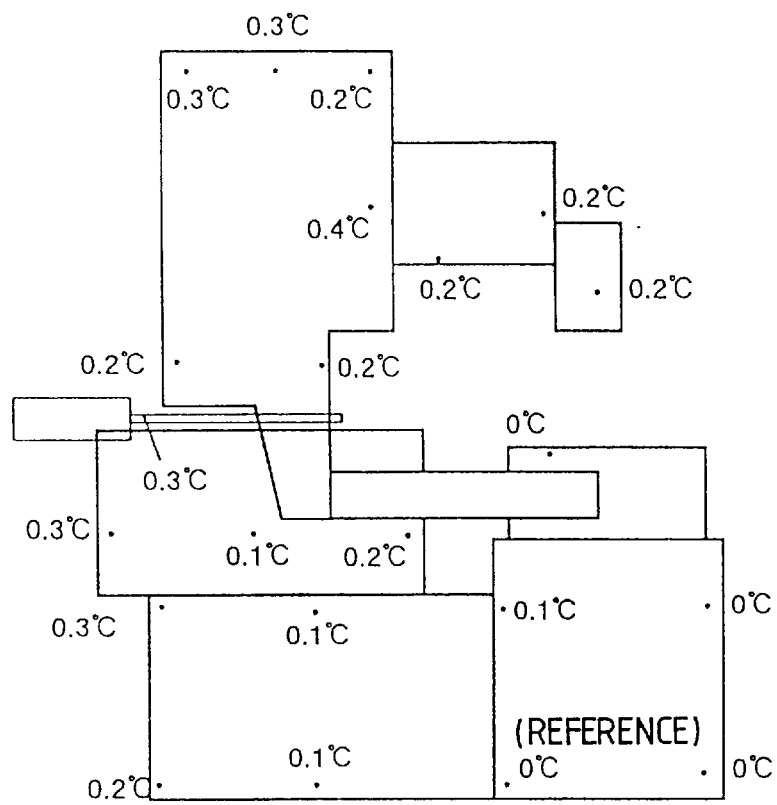
FIGS. 12A and 12B are diagrams showing temperature distributions throughout the main body of the the embodiment apparatus.
Figure 12B:
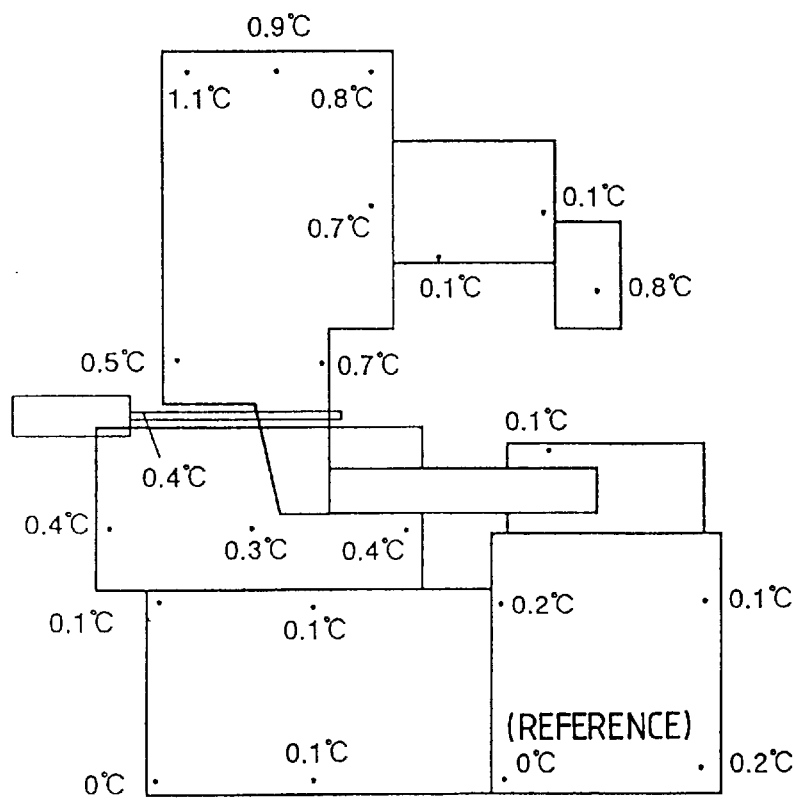

Temperature was measured at the respective portions of the wire electrode discharge machining apparatus of FIG. 1. The results of the measurement are shown in FIGS. 12A and 12B. To measure the temperature variation, the FIG. 1 wire electrode discharge machining apparatus was placed in the surroundings test room 23. Ambient temperature was increased by 3° at a fixed inclination for 12 hours, and thereafter decreased at a fixed inclination by 3° for 12 hours.

To obtain a temperature distribution shown in FIG. 12A, the machining liquid 15 is circulated through the beam member 16 in a state that the fan 22 is not operated. To obtain a temperature distribution shown in FIG. 12B, the machining liquid 15 is circulated through the beam member 16 in a state that the fan 22 is being operated. The temperature values were measured after 12 hours, as matter of course. As seen from the figure, by the blowing of air by the fan 22, temperature variation quantities after 12 hours are uniformized at the respective portions of the wire electrode discharge machining apparatus.

With the use of the fan 22, the temperature variation quantities are substantially uniform throughout the wire electrode discharge machining apparatus shown in FIG. 1. The substantial uniformity of the temperature variation quantities makes the thermal expansions of the discharge machining apparatus substantially uniform since those thermal expansions depend on the thermal expansion coefficients and the temperature variation quantities. Where the major structure constituent members, components parts and the like of the wire electrode discharge machining apparatus are made of such materials as to have substantially equal thermal expansion coefficients, the thermal expansion quantities of the upper wire guide 6, the lower wire guide 8 and table 2 are substantially equal to one another. The result is to minimize a positional shift of the workpiece put on the table 2 relative to the wire electrode 11, which are located between the upper wire guide 6 and the lower wire guide 8.

(Embodiment 2)

Figure 13:
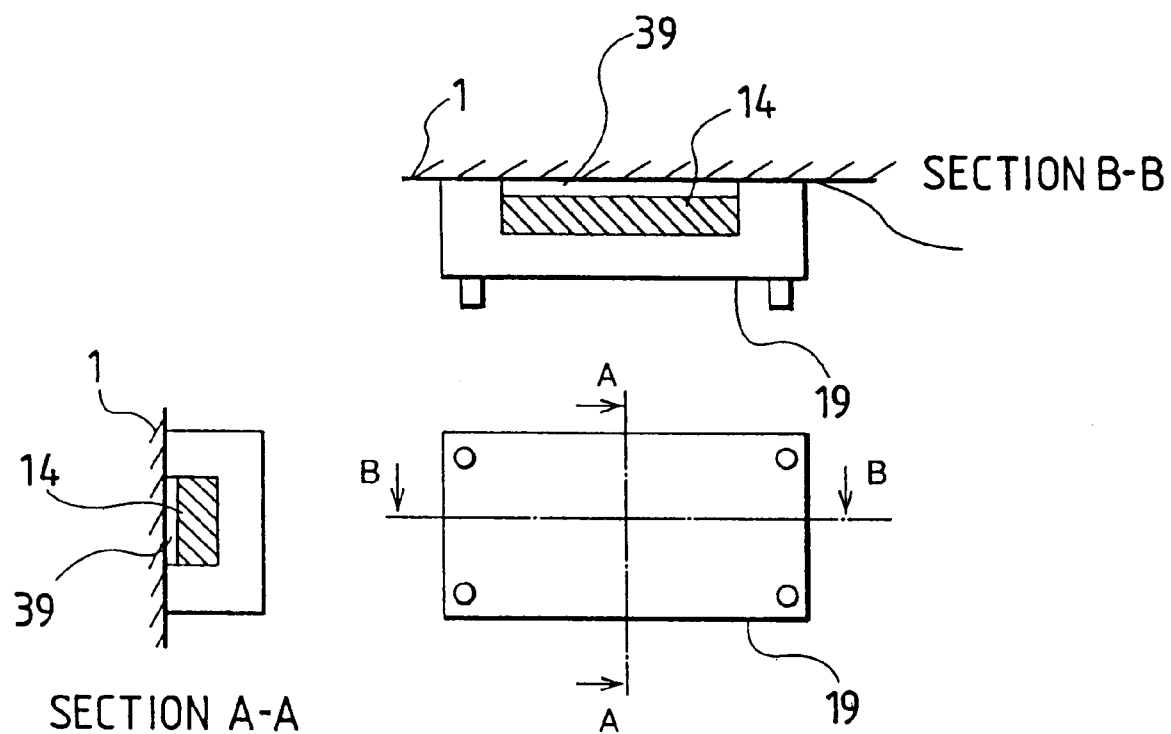
FIG. 13 is a diagram showing another cover structure including a covering member of a temperature sensor in the wire electrode discharge machining apparatus according to a second embodiment of the present invention.

FIG. 13 is a diagram showing another cover structure including an adiabatic covering member of the temperature sensor 14 in the wire electrode discharge machining apparatus of a second embodiment of the present invention.

The construction of the wire electrode discharge machining apparatus of the present embodiment is substantially the same as of the FIG. 1 construction. The FIG. 1 construction will be referred to only when it is necessary in the description to follow.

Reference numeral 19 designates a covering member, made of adiabatic material, mounted on the outer surface of the temperature sensor 14 attached to the main body of the wire electrode discharge machining apparatus. The structure of it is the same as that of the covering member in the first embodiment. An adiabatic member 39 is located between the temperature sensor 14 and the main body of the wire electrode discharge machining apparatus. With provision of the adiabatic member 39, a sensitivity of the temperature sensor 14 can properly be adjusted since a flow of heat from the mechanical structure members into the sensor can be adjusted by changing the thickness and material of the adiabatic member 39.

The thermal expansion quantities of the beam member 16 and the lower arm 7 can be controlled through the machining liquid 15 whose temperature is adjusted to the temperature detected by the temperature sensor 14. The thermal expansion difference between the table 2 and the wire electrode 11 can be reduced by properly selecting the thickness of the adiabatic member 39, whereby the workpiece can be machined with high precision.

It is evident that the wire electrode discharge machining apparatus can achieve the same effects as mentioned above if it is constructed such that the machining liquid 15 whose temperature is controlled by the machining liquid cooling means 13 is in contact with the lower arm 7 and the table 2.

(Embodiment 3)

Figure 14:
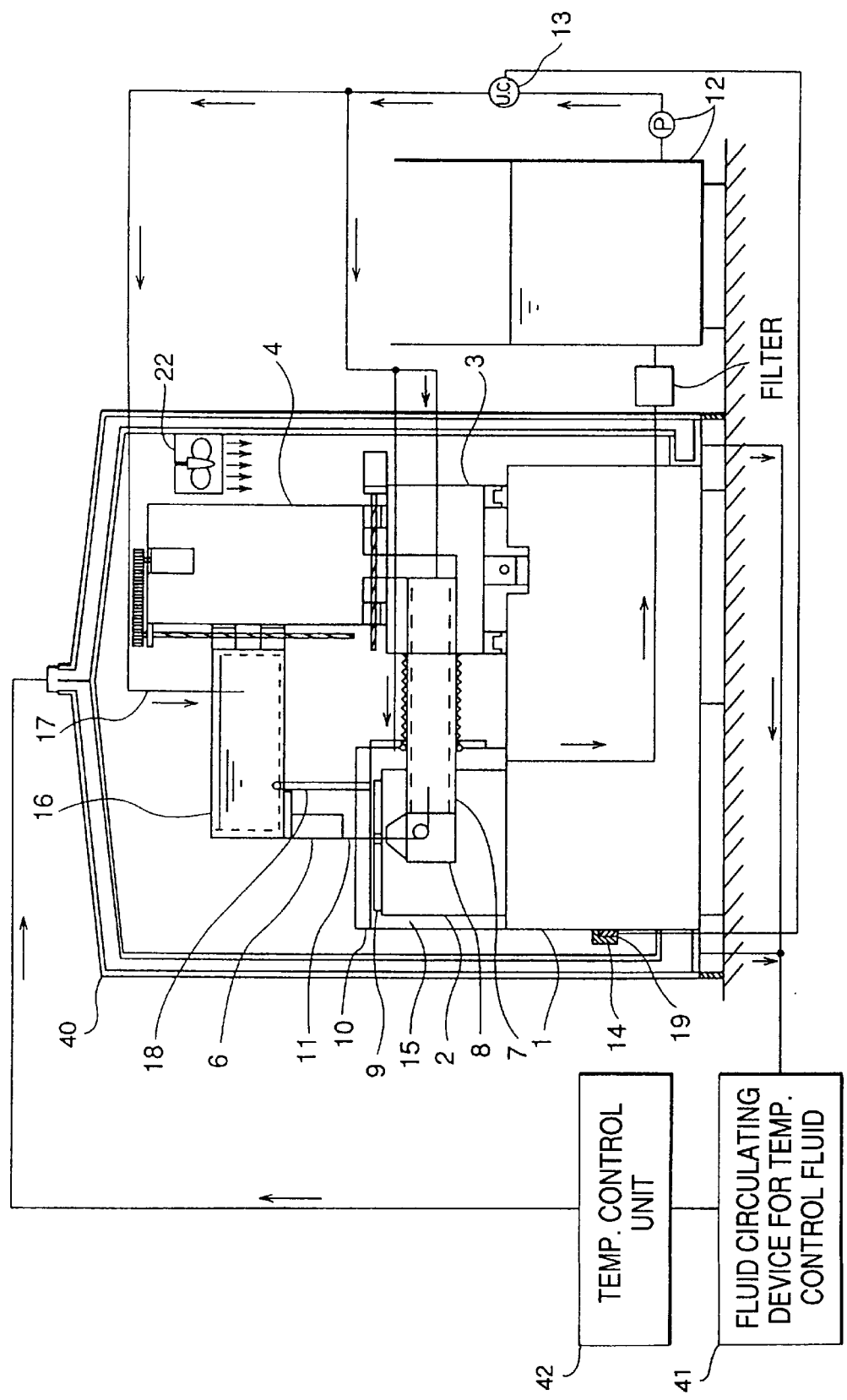
FIG. 14 is a diagram schematically showing a wire electrode discharge machining apparatus according to a third embodiment of the present invention.

FIG. 14 is a diagram schematically showing a wire electrode discharge machining apparatus according to a third embodiment of the present invention. In this embodiment, the construction of the wire electrode discharge machining apparatus is substantially the same as of the first embodiment except for the cover 20 and the adiabatic member 21.

Reference numeral 40 designates a covering member for covering the wire electrode discharge machining apparatus. 41 is a fluid circulating device for circulating a fluid within the covering member 40. 42 is a temperature control unit for controlling temperature of the fluid circulating within the fluid circulating device 41.

With such a construction, temperature of the fluid is controlled by the temperature control unit 42, and the temperature controlled fluid is circulated within the covering member 40 by the fluid circulating device 41. Therefore, the temperature of the covering member 40 can be kept substantially constant by circulating a proper amount of fluid in the covering member. The outside of the covering member 40 is thermally isolated from the inside thereof. Therefore, temperature within the covering member 40 is little varied if the ambient temperature varies. The main body of the wire electrode discharge machining apparatus is deformed less as the ambient temperature varies, so that the machining accuracy is improved.

(Embodiment 4)

Figure 15:
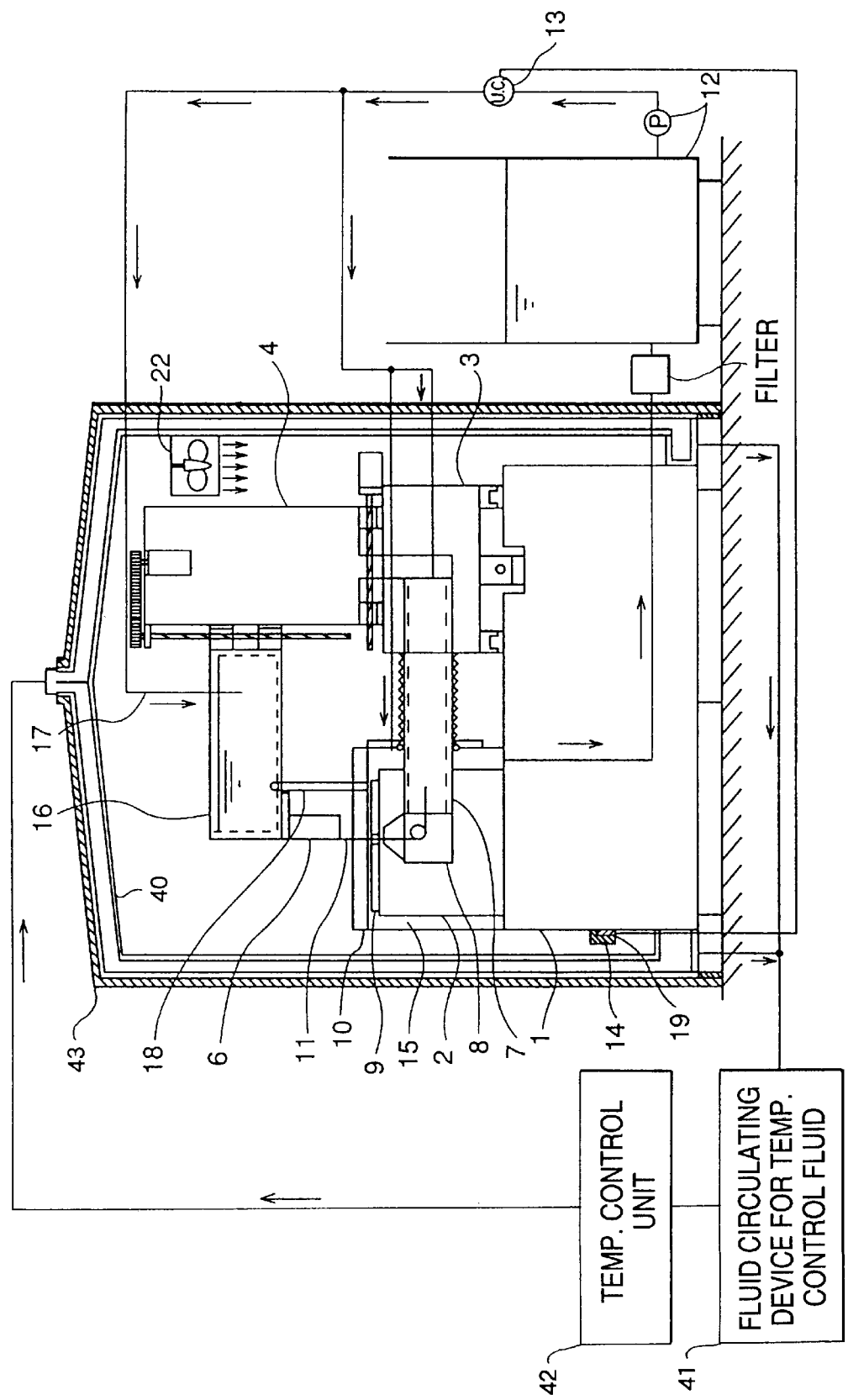
FIG. 15 is a diagram schematically showing a wire electrode discharge machining apparatus according to a fourth embodiment of the present invention.

FIG. 15 is a diagram schematically showing a wire electrode discharge machining apparatus according to a fourth embodiment of the present invention.

In this embodiment, an adiabatic member 43 is provided covering the covering member 40 that used in the embodiment 3.

The adiabatic member 43 adiabatically functions to reduce the heat transfer, per unit time, between its surrounding air and the covering member 40. Therefore, it is possible to keep temperature within the covering member 40 at constant value in an efficient manner. This leads to a decrease in thermal deformation of the main body of the wire electrode discharge machining apparatus when the surrounding temperature varies.

(Embodiment 5)

Figure 16:
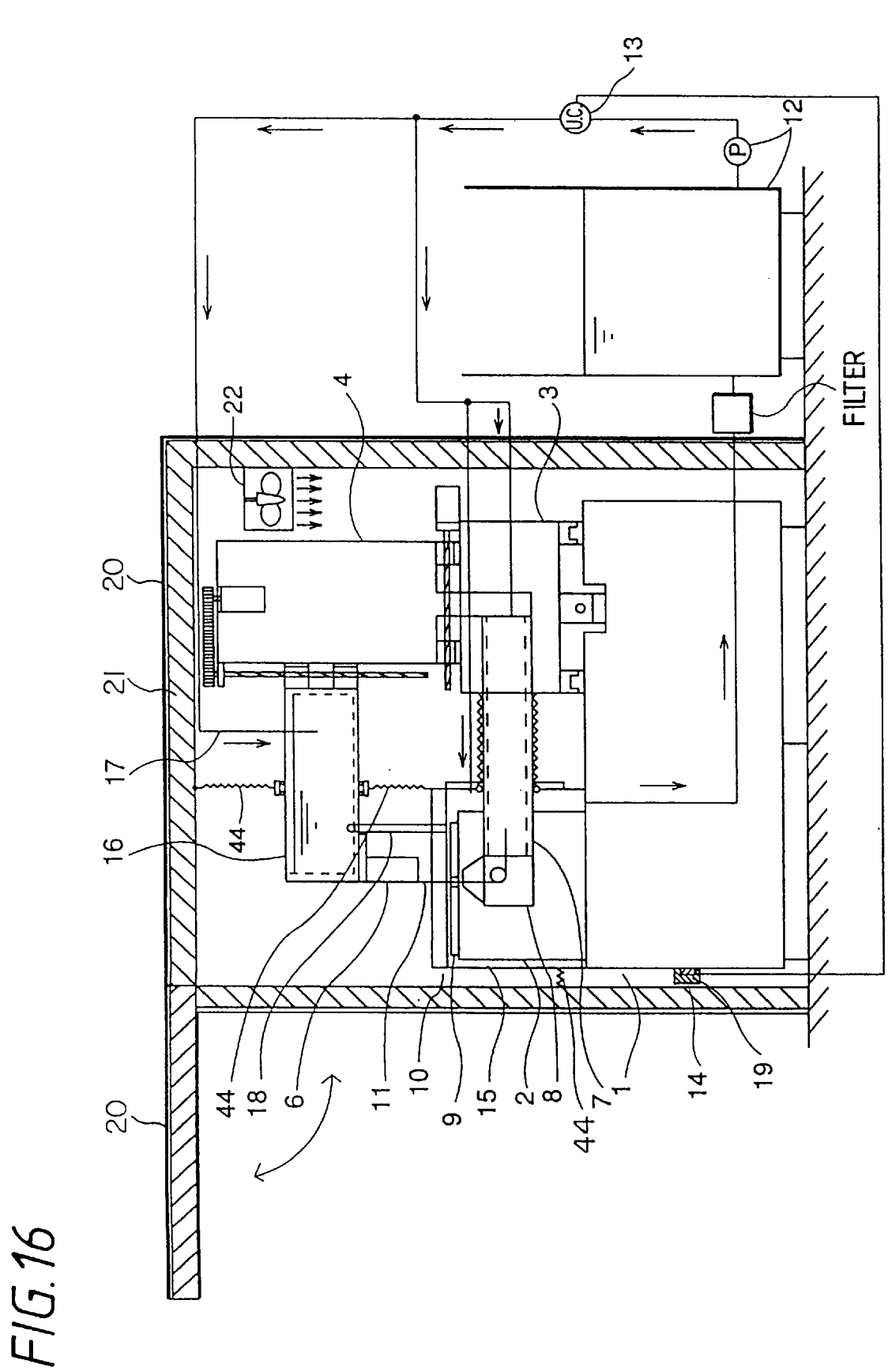
FIG. 16 is a diagram schematically showing a wire electrode discharge machining apparatus according to a fifth embodiment of the present invention.

FIG. 16 is a diagram schematically showing a wire electrode discharge machining apparatus according to a fifth embodiment of the present invention.

In this embodiment, a flexible partitioning member 44 is located within the cover structure including the cover 20 and the adiabatic member 21, which is described in the first embodiment. The partitioning member 44 is provided for partitioning the machining bath 10 from the major structure members of the wire electrode discharge machining apparatus within the cover 20.

If the partitioning member 44 is not provided, when a workpiece 9 is put on the table 2, the cover 20 is opened and the ambient air flows into the machining apparatus. At this time, the air comes in contact with the major structures of the machining apparatus, such as the column 4 and the saddle 3. To prevent this, the present embodiment is constructed such that when the cover 20 is opened, the major structures including at least the column 4, saddle 3 and bed 1 are covered with the partitioning member 44 and the cover structure including the cover 20 and the adiabatic member 21. With such a construction, when the cover 20 is opened, the major structures of the machining apparatus are little varied in their temperature. Therefore, little thermal deformation takes place in the major structures, and the machining accuracy is improved.

(Embodiment 6)

Figure 17:
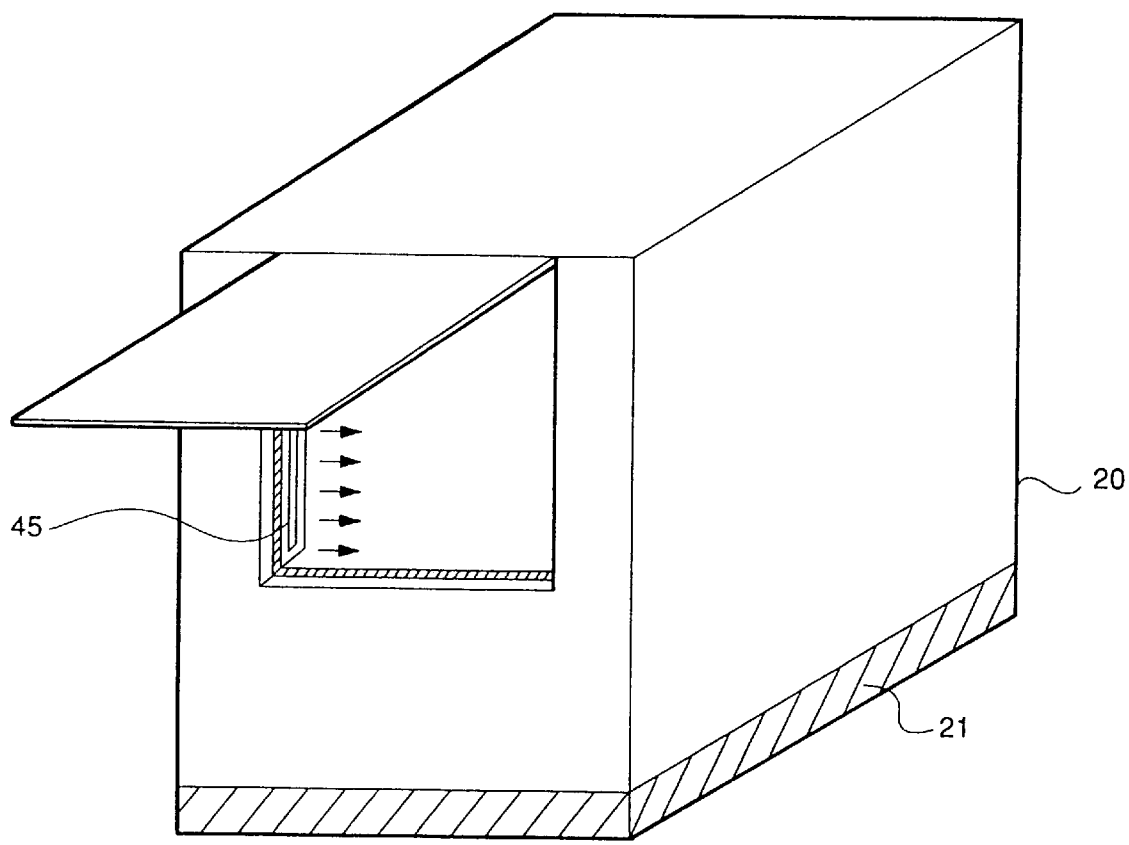
FIG. 17 is a perspective view showing a cover structure constituting a sixth embodiment of the present invention.

FIG. 17 is a perspective view showing a cover structure constituting a sixth embodiment of the present invention. In the figure, reference numeral 45 designates a fan provided at the entrance of the door of the cover 20, which is opened when a workpiece is put on the table 2.

The fan 45 blows air out of the cover 20 so as to partition the spaces inside and outside the cover 20 at the door entrance of the cover 20, to thereby prevent air from entering the space inside the cover 20. A temperature variation inside the cover 20, caused by its surrounding air, is suppressed to be extremely small. This results in eliminating a temperature variation of the main body of the wire electrode discharge machining apparatus. Further, a thermal deformation of the apparatus body, which is caused by its temperature variation, is also reduced, and hence the machining accuracy is improved.

The first aspect of the invention defines a wire electrode discharge machining apparatus having upper and lower wire guides for slidably supporting a wire electrode above a workpiece, nozzles of the upper and lower wire guides, a beam member being horizontally extended, one end of the beam member being integral with a column or vertically movable, and the other end thereof being provided with the upper wire guide, a lower arm of which one end is fixed to the column and other end is provided with the lower wire guide, whereby a workpiece is machined in a discharging manner while machining liquid is supplied from the nozzles to a working portion, the improvement being characterized in that a machine temperature detecting means for detecting temperature of a main body of the wire electrode discharge machining apparatus is provided, the beam member and the lower arm are hollowed, and a fluid whose temperature is adjusted to machine temperature derived from the machine temperature detecting means is circulated through the beam member and the lower arm. With such a construction, the beam member, the lower arm and mechanical structure have equal temperature values, so that the quantities of displacements of those members and structure, which arise from the thermal expansions of the same are uniform. The thermal expansion difference between the upper and lower arms is minimized, and the thermal expansion difference between the wire, which is located between the upper and lower arms, and the work put on the mechanical structure main body is minimized. Therefore, the straightness of the wire electrode supported by the upper and lower wire guides is improved. Further, a positional shift of the wire electrode stretched between the upper and lower guides relative to the workpiece put on the table is considerably reduced. The result is to improve the machining accuracy of the wire EDM apparatus. A machine temperature detecting means for detecting temperature of a main body of the wire electrode discharge machining apparatus is provided, the beam member and the lower arm are hollowed, and a fluid whose temperature is adjusted to machine temperature derived from the machine temperature detecting means is circulated through the beam member and the lower arm. Therefore, the fluid circulating mechanism of a simple construction makes temperature values uniform throughout the apparatus body. This brings about the simplification of the fluid circulating mechanism, and less cost to manufacture.

The second aspect of the invention defines a wire electrode discharge machining apparatus having upper and lower wire guides for slidably supporting a wire electrode above a workpiece, nozzles of the upper and lower wire guides, a beam member being horizontally extended, one end of the beam member being integral with a column or vertically movable, and the other end thereof being provided with the upper wire guide, a lower arm of which one end is fixed to the column and other end is provided with the lower wire guide, whereby a workpiece is machined in a discharging manner while machining liquid is supplied from the nozzles to a working portion, the improvement being characterized in that a machine temperature detecting means for detecting temperature of a main body of the wire electrode discharge machining apparatus is provided, the lower arm is hollowed, a housing member is provided in contact with the outer surface of the beam member, and a fluid whose temperature is adjusted to machine temperature derived from the machine temperature detecting means is circulated through the housing member and the lower arm. With such a construction, the machining accuracy is improved by merely additionally using the housing member to the conventional wire electrode discharge machining apparatus. In other words, the additional use of the housing member is cheaper than the replacement of the conventional beam member with the beam member of the invention. The same useful effects of the second invention are comparable with those of the first aspect of the invention.

The third aspect of the invention specifically defines the wire electrode discharge machining apparatus according to the first and second aspects of the invention such that a fluid circulating through the beam member and the lower arm or the housing provided in contact with the outer surface of the beam member and the lower arm is a machining liquid whose temperature is adjusted to machine temperature derived from the machine temperature detecting means. With this unique feature, temperature of the beam member and the lower arm may be adjusted to machine temperature without any additional machining liquid temperature control unit. Therefore, this invention has a useful effect of low cost to manufacture, like the first and second aspects of the invention.

A fourth aspect of the invention defines a wire electrode discharge machining apparatus having upper and lower wire guides for slidably supporting a wire electrode above a workpiece, nozzles of the upper and lower wire guides, a beam member being horizontally extended, one end of the beam member being integral with a column or vertically movable, and the other end thereof being provided with the upper wire guide, a lower arm of which one end is fixed to the column and other end is provided with the lower wire guide, whereby a workpiece is machined in a discharging manner while machining liquid is supplied from the nozzles to a working portion, the improvement characterized in that a machine temperature detecting means for measuring temperature of a main body of the wire electrode discharge machining apparatus is provided, and a fluid whose temperature is adjusted to machine temperature derived from the machine temperature detecting means is a machining liquid supplied from the nozzles. The wire electrode discharge machining apparatus thus constructed minimizes a temperature difference between the machining liquid and the machine. Therefore, there is substantially eliminated local deformations caused by a temperature difference between a portion of the apparatus where it is in contact with the machining liquid and the remaining portions, and the thermal expansion difference between them. This leads to improvement of the machining accuracy.

A fifth aspect of the invention defines a wire electrode discharge machining apparatus in which a workpiece is machined through a discharge taking place in a minute gap, which is located between a wire electrode and a workpiece and is filled with machining liquid, upper and lower wire guides slidably supporting the wire electrode above the workpiece, the improvement characterized in that a part or the whole of the wire electrode discharge machining apparatus is covered with covering means made of an adiabatic material. Therefore, the machining accuracy of the wire electrode discharge machining apparatus is improved. Also when the wire electrode discharge machining apparatus is used in a thermostatic room, temperature of the apparatus varies less since the construction of the invention lessens thermal disturbances by person's going in and out of the room, the wire EDM apparatus located close to it, and the like. The result is to decrease a positional shift of the upper wire to the lower wire, which is due to temperature differences among the structure portions, and different temperature variations with time. This leads to the improvement of the machining accuracy of the wire EDM apparatus. Thus, it never happens that the temperature controlled air enters through the entrance of the air conditioner in the thermostatic room and comes in contact with the main body of the discharge machining apparatus. The result is to reduce temperature differences in the discharge machining apparatus and lessen the local deformations of the apparatus body. In a case where the covering means for covering the discharge machining apparatus is shaped like a box, it is easy to mount the adiabatic member, and to reduce the gap for the adiabatic member. Accordingly, the mounting of the adiabatic member is easier than the direct mounting of the adiabatic member to the main body of the complicatedly constructed discharge machining apparatus. Additionally, it is prevented that the outside air directly comes in contact with the main body of the discharge machining apparatus. The result is the reduction of cost to manufacture and the improvement of the machining accuracy.

A sixth aspect of the invention more specifically defines the wire electrode discharge machining apparatus of the fifth aspect of the invention such that a temperature controlled fluid is circulated through the covering means. A temperature variation caused by thermal disturbances, e.g., person's going in and out of the thermostatic room less affects the discharge machining apparatus. This reduces the quantities of relative displacements of the lower arm, the beam member and the table, which are due to their thermal expansions. Further, a positional shift of the wire electrode stretched between the upper and lower guides relative to the workpiece put on the table is considerably reduced. The result is to improve the machining accuracy. Also in other places than the thermostatic room, temperature variation little affects the discharge machining apparatus. Therefore, the machining accuracy is more improved than in the conventional discharge machining apparatus. It is possible to reduce a temperature variation of the main body of the discharge machining apparatus by use of an air conditioner whose capacity is smaller than the air conditioning capacity required when the inside of the covering means including the main body of the discharge machining apparatus is entirely temperature controlled. This leads to the reduction of the required space and cost to manufacture.

A seventh aspect of the invention more specifically defines the wire electrode discharge machining apparatus of the fifth or sixth aspect of the invention such that the fluid is agitated in the covering means. The unique construction provides a uniform temperature distribution throughout the discharge machining apparatus. This uniformizes the quantities of relative displacements of the lower arm, the beam member and the table, which are due to their thermal expansions. Further, a positional shift of the wire electrode stretched between the upper and lower guides relative to the workpiece put on the table is considerably reduced. The result is to improve the machining accuracy.

An eighth aspect of the invention specifically defines the wire electrode discharge machining apparatus of the fifth, sixth or seventh aspect of the invention such that the fluid inside the covering means is circulated so as to close an opening defined by a door of the covering means. The result is that a room temperature variation caused by thermal disturbances, e.g., person's going in and out, is lessened, and that an influence on the wire electrode discharge machining apparatus by outside air which comes in when a workpiece is put on the work table is greatly reduced. This reduces the quantities of relative displacements of the lower arm, the beam member and the table, which are due to their thermal expansions. Further, a positional shift of the wire electrode stretched between the upper and lower guides relative to the workpiece put on the table is considerably reduced. The result is to improve the machining accuracy.

A ninth aspect of the invention specifically defines the wire electrode discharge machining apparatus of the fifth, sixth, seventh or eighth aspect of the invention such that a partitioning means for partitioning a space in which a thermostatic bath and the cover of the covering means from the remaining space is provided inside the covering means. The result is that a room temperature variation caused by thermal disturbances, e.g., person's going in and out, is lessened, and that an influence by outside air which comes in when a workpiece is put on the work table affects the wire electrode discharge machining apparatus to a lesser extent. This reduces the quantities of relative displacements of the lower arm, the beam member and the table, which are due to their thermal expansions. Further, a positional shift of the wire electrode stretched between the upper and lower guides relative to the workpiece put on the table is considerably reduced. The result is to improve the machining accuracy.

A tenth aspect of the invention defines a wire electrode discharge machining apparatus having upper and lower wire guides for slidably supporting a wire electrode above a workpiece, nozzles of the upper and lower wire guides, a beam member being horizontally extended, one end of the beam member being integral with a column or vertically movable, and the other end thereof being provided with the upper wire guide, a lower arm of which one end is fixed to the column and other end is provided with the lower wire guide, whereby a workpiece is machined in a discharging manner while machining liquid is supplied from the nozzles to a working portion, the wire electrode discharge machining apparatus characterized in that covering means made of adiabatic material is disposed surrounding a temperature sensor for controlling the machining liquid. Therefore, it is possible to reduce the quantities of expansions of the lower or upper arm and the beam member which are due to their thermal expansions, and hence to reduce a positional shift of the upper wire guide relative to the lower wire guide, which are held at the tips of the lower arm and the beam member. As a result, the straightness of the wire electrode supported by the wire guides is improved, and the machining accuracy is improved. Further, to implement the invention, it is only needed that only one part of the adiabatic member is additionally used. Improvement of the machining accuracy of the discharge machining apparatus is realized at low cost and readily.

An eleventh aspect of the invention specifically defines the wire electrode discharge machining apparatus set forth in any of the first to ninth aspects of the invenion such that covering means made of adiabatic material is disposed surrounding a temperature sensor for controlling the machining liquid. It is possible to control the quantities of expansions of the lower arm and the beam member, which are due to their thermal expansions. And a positional shift of the wire electrode stretched between the upper and lower guides relative to the workpiece put on the table is considerably reduced. The result is to improve the machining accuracy.

In the sixth aspect of the invention, a temperature controlled fluid is circulated through a hollowed covering member. Therefore, a heat capacity of the temperature controlled fluid is small, so that an air conditioning equipment of a small capacity suffices for controlling temperature of the fluid. Since the temperature controlled air is prevented from entering the space inside the covering means, the temperature distribution on the discharge machining apparatus is less varied. In other words, it is possible to uniformize the thermal expansions of the major structures of the discharge machining apparatus. This lessens a positional shift of the upper wire guide to the lower wire guide, and improves the machining accuracy of the discharge machining apparatus.

A twelfth aspect of the invention specifically defines the wire electrode discharge machining apparatus set forth in any of the fifth to eleventh aspects of the invention such that a gap between the covering means and a floor on which the covering means is put is closed with a flexible member. This unique construction prevents air from going into and out of the space inside the covering means even if the floor is irregular. The result is to reduce the thermal deformation of the main body of the wire electrode discharge machining apparatus and to improve the machining accuracy of the discharge machining apparatus.

The invention defined any of the first to twelfth aspect of the invention is able to improve the machining accuracy of the discharge machining apparatus without additional use of the air conditioner.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A wire electrode discharge machining apparatus, comprising:
   upper and lower wire guides for slidably supporting a wire electrode above a workpiece;
   nozzles provided in said upper and lower wire guides;
   a beam member being horizontally extended having a first end integral with a column or vertically movable, and a second end provided with said upper wire guide, wherein said beam member is hollowed;
   a lower arm having a first end fixed to said column and a second end provided with said lower wire guide, whereby said workpiece is machined in a discharging manner while machining liquid is supplied from said nozzles to a working portion, wherein said lower arm is hollowed;
   machine temperature detecting means for detecting temperature of a main body of said wire electrode discharge machining apparatus; and
   a fluid whose temperature is adjusted to machine temperature derived from said machine temperature detecting means;
   wherein said fluid is circulated through said beam member and said lower arm in a heat-exchanging manner.

2. The wire electrode discharge machining apparatus according to claim 1, wherein said fluid, circulating through said beam member and said lower arm, is said machining liquid whose temperature is adjusted to machine temperature derived from said machine temperature detecting means.

3. The wire electrode discharge machining apparatus according to claim 1, wherein said fluid is said machining liquid supplied from said nozzles.

4. The wire electrode discharge machining apparatus according to claim 1, further comprising a temperature detector cover made of adiabatic material and disposed surrounding machine temperature detecting means, wherein at least a portion of said temperature detecting means is thermally connected to said main body of said wire electrode discharge machining apparatus, wherein said temperature detector cover is dimensioned to cover substantially only an outer surface of said machine temperature detecting means, and wherein said temperature detector cover substantially thermally isolates said machine temperature detecting means from an environment that directly contacts said main body of said wire electrode discharge machining apparatus.

5. The wire electrode discharge machining apparatus according to claim 1, further comprising:
   a temperature detector cover made of adiabatic material and disposed surrounding machine temperature detecting means, wherein said temperature detector cover is dimensioned to cover substantially only an outer surface of said machine temperature detecting means, and wherein said temperature detector cover substantially thermally isolates said machine temperature detecting means from an environment that directly contacts said main body of said wire electrode discharge machining apparatus; and
   a sensitivity control member made of an adiabatic material disposed between said machine temperature detecting means and said main body of said wire electrode discharge machining apparatus.

6. A wire electrode discharge machining apparatus comprising:
   upper and lower wire guides for slidably supporting a wire electrode above a workpiece;
   nozzles provided in said upper and lower wire guides;
   a beam member being horizontally extended having a first end integral with a column or vertically movable, and a second end provided with said upper wire guide;
   a lower arm having a first end fixed to said column and a second end provided with said lower wire guide, whereby said workpiece is machined in a discharging manner while machining liquid is supplied from said nozzles to a working portion, wherein said lower arm is hollowed;
   machine temperature detecting means for detecting temperature of a main body of said wire electrode discharge machining apparatus;
   a housing provided in contact with an outer surface of said beam member; and
   a fluid whose temperature is adjusted to machine temperature derived from said machine temperature detecting means, wherein said fluid is circulated through said housing and said lower arm in a heat-exchanging manner.

7. The wire electrode discharge machining apparatus according to claim 6, wherein said fluid, circulating through said housing provided in contact with the outer surface of said beam member and said lower arm, is said machining liquid whose temperature is adjusted to machine temperature derived from said machine temperature detecting means.

8. A wire electrode discharge machining apparatus in which a workpiece is machined through a discharge taking place in a minute gap, which is located between a wire electrode and a workpiece and is filled with machining liquid, said apparatus comprising:

upper and lower wire guides for slidably supporting said wire electrode above the workpiece;

a cover that covers substantially all of said wire electrode discharge machining apparatus; and a temperature controlled fluid, wherein said temperature controlled fluid is circulated through said cover.

9. The wire electrode discharge machining apparatus according to claim 8, wherein said temperature controlled fluid is agitated in said cover.

10. The wire electrode discharge machining apparatus according to claim 8, wherein said cover includes a door, and said temperature controlled fluid inside said cover is circulated so as to close an opening defined by said door.

11. The wire electrode discharge machining apparatus according to claim 8, wherein a partitioning means is provided inside said cover for partitioning a working space, in which a machining bath and said door of said cover are located, from a remaining space.

12. The wire electrode discharge machining apparatus according to claim 8, wherein said cover is made of an adiabatic material.

13. The wire electrode discharge machining apparatus according to claim 8, further comprising a flexible member which extends between said cover and a floor on which said cover is put, wherein said flexible member substantially seals a gap between said cover and said floor.

14. The wire electrode discharge machining apparatus according to claim 7, further comprising a fan disposed within said cover, wherein said fan circulates air within said cover.

15. A wire electrode discharge machining apparatus in which a workpiece is machined through a discharge taking place in a minute gap, which is located between a wire electrode and a workpiece and is filled with machining liquid, said apparatus comprising:

upper and lower wire guides for slidably supporting said wire electrode above the workpiece;

a cover that covers at least a portion of said wire electrode discharge machining apparatus; and a temperature controlled fluid, wherein said temperature controlled fluid is circulated through said cover;

wherein said temperature controlled fluid is agitated in said cover.

16. The wire electrode discharge machining apparatus according to claim 15, wherein said cover is made of an adiabatic material.

* * * * *